United States Patent
Quicke et al.

(10) Patent No.: US 12,310,366 B2
(45) Date of Patent: *May 27, 2025

(54) HERBICIDAL COMPOSITIONS FOR ANIMAL GRAZELANDS AND METHODS FOR APPLYING THE SAME

(71) Applicant: DISCOVERY PURCHASER CORPORATION, Wilmington, DE (US)

(72) Inventors: Harold Quicke, Cary, NC (US); David R. Spak, Cary, NC (US); Derek J. Sebastian, Greeley, CO (US); Roland Maynard, Chapel Hill, NC (US)

(73) Assignee: Discovery Purchaser Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/430,224

(22) Filed: Feb. 1, 2024

(65) Prior Publication Data

US 2024/0164381 A1 May 23, 2024

Related U.S. Application Data

(60) Continuation of application No. 18/151,076, filed on Jan. 6, 2023, now Pat. No. 11,917,996, which is a continuation of application No. 17/737,451, filed on May 5, 2022, now abandoned, which is a division of application No. 17/675,825, filed on Feb. 18, 2022, now Pat. No. 11,849,730, which is a continuation of application No. 17/496,243, filed on Oct. 7, 2021, now Pat. No. 11,800,870, which is a continuation of application No. 16/710,965, filed on Dec. 11, 2019, now Pat. No. 11,166,463, which is a continuation of application No. PCT/US2019/062634, filed on Nov. 21, 2019.

(60) Provisional application No. 62/773,037, filed on Nov. 29, 2018.

(51) Int. Cl.
 *A01N 43/68* (2006.01)
(52) U.S. Cl.
 CPC ..................... *A01N 43/68* (2013.01)
(58) Field of Classification Search
 CPC .................. A01N 43/68; Y02A 90/40
 See application file for complete search history.

(56) References Cited

U.S. PATENT DOCUMENTS

| | | | |
|---|---|---|---|
| 8,093,421 B2 | 1/2012 | Lui et al. |
| 8,114,991 B2 | 2/2012 | Ahrens et al. |
| 8,236,729 B2 | 8/2012 | Hacker et al. |
| 8,283,495 B2 | 10/2012 | Dietrich et al. |
| 8,426,342 B2 | 4/2013 | Kilian et al. |
| 8,492,313 B2 | 7/2013 | Gatzweiler et al. |
| 8,586,503 B2 | 11/2013 | Hacker et al. |
| 8,728,977 B2 | 5/2014 | Rosinger et al. |
| 8,759,584 B2 | 6/2014 | Ford et al. |
| RE46,095 E | 8/2016 | Hacker et al. |
| 9,439,430 B2 | 9/2016 | Menne et al. |
| 9,723,836 B2 | 8/2017 | Spesard et al. |
| 9,796,737 B2 | 10/2017 | Ford et al. |
| RE47,666 E | 10/2019 | Hacker et al. |
| 10,494,350 B2 | 12/2019 | Ressel et al. |
| 10,772,328 B2 | 9/2020 | Spak et al. |
| 11,166,463 B2 | 11/2021 | Quicke et al. |
| 2010/0016158 A1 | 1/2010 | Kilian et al. |
| 2012/0142533 A1 | 6/2012 | Richard et al. |
| 2013/0267417 A1 | 10/2013 | Seitz et al. |
| 2014/0031221 A1 | 1/2014 | Yerkes et al. |
| 2014/0256550 A1 | 9/2014 | Schulz |
| 2016/0002168 A1 | 1/2016 | Bickers et al. |
| 2016/0102072 A1 | 4/2016 | Hoekstra et al. |
| 2018/0206499 A1 | 7/2018 | Spak et al. |
| 2018/0289008 A1 | 10/2018 | Sebastian et al. |
| 2020/0107546 A1 | 4/2020 | Spak et al. |
| 2022/0022455 A1 | 1/2022 | Quicke et al. |
| 2022/0167619 A1 | 6/2022 | Quicke et al. |
| 2022/0256850 A1 | 8/2022 | Quicke et al. |
| 2023/0143100 A1 | 5/2023 | Quicke et al. |

FOREIGN PATENT DOCUMENTS

| | | |
|---|---|---|
| CA | 2903643 A1 | 9/2014 |
| CN | 105052953 A | 11/2015 |
| WO | 2010009819 A2 | 1/2010 |
| WO | 2018136352 A1 | 7/2018 |
| WO | 2018187301 A1 | 10/2018 |
| WO | 2020076692 A1 | 4/2020 |
| WO | 2020/112491 A1 | 6/2020 |

OTHER PUBLICATIONS

U.S. Environmental Protection Agency, "Esplanade F Herbicide," issued Mar. 3, 2011, accessed at https://www3.epa.gov/pesticides/chem_search/ppls/000432-01517-20110303.pdf, 9 pages.
Notice of Allowance mailed Apr. 27, 2022 in U.S. Appl. No. 17/675,825, Quicke, H., et al., filed Feb. 18, 2022, 11 pages.
Notice of Allowance mailed Mar. 2, 2023 in U.S. Appl. No. 17/675,825, Quicke, H., et al., filed Feb. 18, 2022, 8 pages.
Office Action mailed Jul. 7, 2022 in U.S. Appl. No. 17/737,451, Quicke, H., et al., filed May 5, 2022, 7 pages.

(Continued)

*Primary Examiner* — Trevor Love

(74) *Attorney, Agent, or Firm* — Maynard Nexsen PC

(57) ABSTRACT

Methods and compositions for controlling undesired vegetation in animal grazelands.

20 Claims, No Drawings

(56) References Cited

OTHER PUBLICATIONS

Government of Canada Pest Management Regulatory Agency, "Proposed Registration Decision: Indaziflam, No. PRD2011-20," published Oct. 7, 2011, accessed at https://www.canada.ca/en/health-canada/services/consumer-product-safety/pesticides-pest-management/public/consultations/indaziflam-proposed-registration-decision-prd2011-20-health-canada-consultation-document.html, 12 pages.
Ulbrich, A., et al., Persistence and Carryover Effect of Imazapic and Imazapyr in Brazilian Cropping Systems, Weed Technol. 19(4):986-991, Cambridge University Press, United Kingdom (2005).
Alex, J.F., "The taxonomy, history, and distribution of Linaria dalmatica," Canadian Journal of Botany 40(2):295-307, Canadian Science Publishing, Canada (1962).
Allen, E.A., et al., "Effects of a spring prescribed burn on the soil seed bank in sagebrush steppe exhibiting pinyon-juniper expansion," West North American Naturalist 68(3):265-277, Monte L. Bean Life Science Museum, United States (2008).
Alonso, D.G., et al., "Sorption-desorption of indaziflam in selected agricultural soils," J. Agric. Food Chem. 59(24):13096-13101, American Chemical Society, United States (2011).
Andersen, M.R., et al., "Value of mountain rye for suppression of annual bromegrasses on semiarid mined lands," Journal of Range Management 45(4):345-351, Allen Press, United States (Jul. 1992).
Arteca, R.N., et al., "A novel method for growing *Arabidopsis thaliana* plants hydroponically," Physiologia Plantarum 108(2):188-193, Wiley, United States (2000).
Baker, W.L., "Fire and restoration of sagebrush ecosystems," Wildlife Society Bulletin 34(1):177-185, Wiley, United States (Mar. 2006).
Baker, W.L., et al., "Effect of Imazapic on Cheatgrass and Native Plants In Wyoming Big Sagebrush Restoration for Gunnison Sage-Grouse," Natural Areas Journal 29(3):204-209, BioOne, United States (2009).
Balch, J.K., et al., "Introduced annual grass increases regional fire activity across the arid western USA (1980-2009)," Global Change Biology 19(1):173-183, Wiley, United States (2013).
Ball, D.A., "Effects of aminocyclopyrachlor herbicide on downy brome (*Bromus tectorum*) seed production under field conditions," Invasive Plant Science and Management 7(4):561-564, Cambridge University Press, United Kingdom (2014).
Bansal, S., et al., "The effects of precipitation and soil type on three invasive annual grasses in the western United States," Journal of Arid Environments 104:38-42, Elsevier, Netherlands (May 2014).
Bashline, L., et al., "The TWD40-2 protein and the AP2 complex cooperate in the clathrin-mediated endocytosis of cellulose synthase to regulate cellulose biosynthesis," Proceedings of the National Academy of Sciences 112(41):12870-12875, National Academy of Sciences, United States (2015).
Beck, K.G., "Biology and Management of the Toadflaxes," revised on Dec. 2014, accessed at https://www.digitalrmbl.org/wp-content/uploads/2016/04/toadflax.pdf, accessed on Mar. 30, 2023, 4 pages.
Beck, K.G., "Downy Brome (*Bromus tectorum*) and Japanese Brome (*Bromus japonicus*) Biology, Ecology, and Management," accessed at https://www.nwcb.wa.gov/pdfs/Downy_brome_and_Japanese_brome_literature_review_Colorado_DRMS_Dec_09.pdf, accessed on Mar. 30, 2023, 60 pages.
Beck, K.G., et al., "Jointed goatgrass (*Aegilops cylindrica*) and downy brome (*Bromus tectorum*) control in perennial grasses," Weed Technol. 9(2):255-259, Cambridge University Press, United Kingdom (1995).
Beck, K.G., et al., "Invasive species defined in a policy context: recommendations from the federal invasive species advisory committee," Invasive Plant Science and Management 1(4):414-421, Cambridge University Press, United Kingdom (2008).
Belnap, J., et al., "Soil biota can change after exotic plant invasion: does this affect ecosystem processes?" Ecology 86(11):3007-3017, Wiley, United States (2005).

Billings, W.D., "Ecological impacts of cheatgrass and resultant fire on ecosystems in the Western Great Basin," in *Proceedings—Ecology and Management of Annual Rangelands*, Monsen, S.B., et al., eds., pp. 22-30, United States Department of Agriculture, United States (1994).
Brisbin, H., et al., "Soil seed bank responses to postfire herbicide and native seeding treatments designed to control Bromus tectorum in a Pinyon-juniper woodland at Zion National Park, USA," Invasive Plant Science and Management 6(1):118-129, Cambridge University Press, United Kingdom (2013).
Brosnan, J.T., et al., "Application placement affects postemergence smooth crabgrass (*Digitaria ischaemum*) and annual bluegrass (*Poa annua*) control with Indaziflam," Weed Technol. 26(4):661-665, Cambridge University Press, United Kingdom (2012).
Brosnan, J.T., et al., "Pre and Post control of annual bluegrass (*Poa annua*) with Indaziflam," Weed Technol. 26(1):48-53, Cambridge University Press, United Kingdom (2012).
Brosnan, J.T., et al., "A Putative Prodiamine-Resistant Annual Bluegrass (*Poa annua*) Population is Controlled by Indaziflam," Weed Science 62(1):138-144, Cambridge University Press, United Kingdom (2014).
Burnside, O.C., et al., "Seed longevity of 41 weed species buried 17 years in eastern and western Nebraska," Weed Science 44:74-86, Cambridge University Press, United Kingdom (1996).
Calo, A., et al., "Integrated treatment with a prescribed burn and postemergent herbicide demonstrates initial success in managing cheatgrass in a northern Colorado natural area," Natural Areas Journal 32(3):300-304, BioOne, United States (2012).
Chambers, J.C., et al., "Using resistance and resilience concepts to reduce impacts of invasive annual grasses and altered fire regimes on the sagebrush ecosystem and greater sage-grouse: A strategic multi-scale approach," Gen. Tech. Rep. RMRS-GTR-326. Fort Collins, Colorado, United States Department of Agriculture, Forest Service, Rocky Mountain Research Station, accessed at http://www.fs.fed.us/rm/pubs/rmrs_gtr326.pdf, accessed on Mar. 30, 2023, 84 pages (Sep. 2014).
Christensen, S., "Crop weed competition and herbicide performance in cereal species and varieties," Weed Research 34(1):29-36, Wiley, United States (1994).
Cocorahs, "CoCoRaHS Water Year Summary Reports," accessed at http://www.cocorahs.org/WaterYearSummary/, accessed on Mar. 30, 2023.
Corio-Costet, M.F., et al., "Effects of isoxaben on sensitive and tolerant plant cell cultures: I. Metabolic fate of isoxaben," Pesticide Biochemistry and Physiology 40(3):246-254, Elsevier, Netherlands (1991).
Crawford, J.A., et al., "Ecology and management of sage-grouse habitat," J. Range Manage. 57(1):2-19, BioOne, United States (2004).
Crowell, E.F., et al., "Pausing of Golgi bodies on microtubules regulates secretion of cellulose synthase complexes in *Arabidopsis*," Plant Cell 21(4):1141-1154, American Society of Plant Biologists, United States (2009).
Cummings, D.C., et al., "Is altering grazing selectivity of invasive forage species vvith patch burning more effective than herbicide treatments?" Rangeland Ecology Management 60(3):253-260, Elsevier, Netherlands (2007).
D'Antonio, C.M., et al., "Biological invasions by exotic grasses, the grass/fire cycle, and global change," Annual Review of Ecology and Systematics 23(1992):63-87, Annual Reviews, United States (1992).
Davies, K.W., et al., "Are We "Missing The Boat" on Preventing The Spread of Invasive Plants In Rangelands?" Invasive Plant Science and Management 4(1):166-172, Cambridge University Press, United Kingdom (2011).
Davies, K.W., et al., "Promoting native vegetation and diversity in exotic annual grass infestations," Restoration Ecology 19(2):159-165, Wiley, United States (2011).
Davies, K.W., "Medusahead dispersal and establishment in sagebrush steppe plant communities," Rangeland Ecol. Manag. 61(1):110-115, Elsevier, Netherlands (2008).

(56) References Cited

OTHER PUBLICATIONS

Davies, K.W., et al., "Medusahead invasion along unimproved roads, animal trails, and random transects," West North American Naturalist 73(1):54-59, Monte L. Bean Life Science Museum, United States (2013).
De Barreda, D.G., et al., "Spring Establishment of Four Warm-Season Turfgrasses After Fall Indaziflam Applications," Weed Technol. 27(3):448-453, Cambridge University Press, United Kingdom (2013).
Debolt, S., et al., "Nonmotile cellulose synthase subunits repeatedly accumulate within localized regions at the plasma membrane in *Arabidopsis hypocotyl* cells following 2, 6-dichlorobenzonitrile treatment," Plant Physiology 145(2):334-338, American Society of Plant Biologists, United States (2007).
Desprez, T., et al., "Resistance against herbicide isoxaben and cellulose deficiency caused by distinct mutations in same cellulose synthase isoform CESA6," Plant Physiology 128(2):482-490, American Society of Plant Biologists, United States (2002).
Diamond, J.M., et al., "Effects of targeted grazing and prescribed burning on community and seed dynamics of a downy brome (*Bromus tectorum*)-dominated landscape," Invasive Plant Science and Management 5(2):259-269, Cambridge Academic Press, United Kingdom (2012).
Dietrich, H., et al., "Inhibitors of cellulose biosynthesis," chapter 7 in *Modern Crop Protection Compounds*, vols. 1-3, Second Edition, pp. 387-423, Wiley, United States (2019).
Ditomaso, J.M., et al., "Exotic plant management in California annual grasslands," in Stromberg, M.R., et al., California Grasslands: Ecology and Managementeds, pp. 281-296 (2007).
Ditomaso, J.M., et al., "Invasive weeds in rangelands: species, impacts, and management," Weed Science 48(2):255-265, Cambridge University Press, United Kingdom (2000).
Ditomaso, J.M., et al., "Rangeland invasive plant management," Rangelands 32(1):43-47, BioOne, United States (2010).
Duke, S.O., "Why have no new herbicide modes of action appeared in recent years?" Pest Management Science 68(4):505-512, Wiley, United States (2011).
Duncan, C.A., et al., "Invasive plants of range and wildlands and their environmental, economical and societal impacts," Duncan C.A., et al., eds., Weed Science Society of America, Lawrence, Kansas, United States (2005).
Duncan, C.A., et al., "Assessing the economic, environmental, and societal losses from invasive plants on rangeland and wildlands," Weed Technol. 18:1411-1416, BioOne, United States (2004).
Eckert Jr., R.E., et al., "A chemical-fallow technique for control of downy brome and establishment of perennial grasses on rangeland," Journal of Range Management 20:35-41, Elsevier, Netherlands (1967).
Ehlert, K.A., et al., "Imazapic activity in a semiarid climate in downy brome (*Bromus tectorum*)-infested rangeland and CRP sites," Weed Technol. 29(3):472-479, BioOne, United States (2015).
Ellstrand, N.C., et al., "Crops gone wild: evolution of weeds and invasives from domesticated ancestors," Evol. Appl. 3(5-6):494-504, Wiley, United States (2010).
Enloe, S.F., et al., "Perennial grass establishment integrated with clopyralid treatment for yellow starthistle management on annual range," Weed Technology 19(1):94-101, BioOne, United States (2005).
Espeland, E.K., et al., "Low-dose glyphosate does not control annual bromes in the Northern Great Plains," Invasive Plant Science and Management 8(3): 334-340, Cambridge University Press, United Kingdom (2015).
Evans, R.A., et al., "Plant litter and establishment of alien annual weed species in rangeland communities," Weed Science 18:697-703, Cambridge University Press, United Kingdom (1970).
Evans, R.A., et al., "Wheatgrass establishment with paraquat and tillage on downy brome ranges," Weeds 15:50-55, Cambridge University Press, United Kingdom (1967).
Fagard, M., et al., "PROCUSTE1 encodes a cellulose synthase required for normal cell elongation specifically in roots and dark-grown hypocotyls of *Arabidopsis*," Plant Cell 12(12):2409-2423, American Society of Plant Physiologists, United States (2000).
Fenesi, A., et al., "Enhanced Fire-Related Traits May Contribute to the Invasiveness of Downy Brome (*Bromus tectorum*)," Invasive Plant Science and Management 9(3):182-194, Cambridge University Press, United Kingdom (2016).
Gerlach, J., et al., "Centaurea solstitialis threatens California's ecosystems," Bulletin of the Ecological Society of America 77:160-161, Wiley, United States (1996).
Guerra, N., et al., "Influence of precipitation and sugarcane straw in aminocyclopyrachlor and indaziflam control efficiency," Planta Daninha. 33(3):535-542, SciELO, Brazil (2015).
Haferkamp, M.R., et al., "Influence of Japanese brome on western wheatgrass yield," Journal of Range Management 50:44-50, University of Arizona, United States (1997).
Haferkamp, M.R., et al., "Suppression of annual bromes impacts rangeland: vegetation responses," Journal of Range Management 54(6):656-662, University of Arizona, United States (2001).
Harmoney, K.R., et al., "Effects of a new herbicide (aminocyclopyrachlor) on buffalograss and forbs in shortgrass prairie," Weed Technology 26(3):455-459, Cambridge University Press, United Kingdom (2012).
Heap, I., "Global perspective of herbicide-resistant weeds," Pest Management Science 70(9):1306-1315, Wiley, United States (2014).
Hewlett, D., et al., "Japanese brome response to atrazine in combination with nitrogen fertilizer in the mixed prairie," Journal of Range Management 34:22-25, University of Arizona, United States (1981).
Hirsch, M.C., et al., "Comparison of herbicides for reducing annual grass emergence in two Great Basin soils," Rangeland Ecology Management 65(1):66-75, Elsevier, Netherlands (2012).
Hughes, J., et al., "The Use of an Optical Brightener in the Study of Plant Structure," Stain Technology 50(5):319-329, Taylor & Francis, United Kingdom (1975).
Humphrey, L.D., et al., "Seed banks of Bromus tectorum-dominated communities in the Great Basin," West North American Naturalist 61:85-92, Monte L. Bean Life Science Museum, United States (2001).
Inoue, M.H., et al., "Bioavailability of diuron, imazapic and isoxaflutole in soils of contrasting textures," Journal of Environmental Science and Health Part B 44(8):757-763, Taylor & Francis, United Kingdom (2009).
James, L.F., et al., "Noxious range weeds," Westview Press, Boulder, Colorado, United States (1991).
Jarvis, M.C., "Cellulose biosynthesis: counting the chains," Plant Physiology 163(4):1485-1486, Oxford Academic Press, United Kingdom (2013).
Jhala, A.J., et al., "Leaching of indaziflam compared with residual herbicides commonly used in Florida citrus," Weed Technol. 26(3):602-607, Cambridge University Press, United Kingdom (2012).
Jhala, A.J., et al., "Tank mixing saflufenacil, glufosinate, and indaziflam improved burndown and residual weed control," Weed Technol. 27(2):422-429, Cambridge University Press, United Kingdom (2013).
Kaapro, J., "Indaziflam—a new herbicide for pre-emergent control of weeds in turf, forestry, industrial vegetation, and ornamentals," in 23rd Asian-Pacific Weed Science Society Conference: Queensland, AU (2012).
Keane, R.E., et al., "Ecological effects of large fires on US landscapes: benefit or catastrophe?" International Journal of Wildland Fire 17(6):696-712, CSIRO Publishing, Australia (2008).
Kelley, W.K., et al., "Managing downy brome (*Bromus tectorum*) in the Central Rockies: land manager perspectives," Invasive Plant Science and Management 6(4):521-535, Cambridge University Press, United Kingdom (2013).
Kessler, K.C., et al., "Litter reduction by prescribed burning can extend downy brome control," Rangeland Ecology Management 68(4):367-374, Elsevier, Netherlands (2015).
Knapp, P.A., "Cheatgrass (*Bromus tectorum* L) dominance in the Great Basin Desert—history, persistence, and influences to human activities," Glob. Environ. Change-Human Policy Dimens. 6(1):37-52, Elsevier, Netherlands (1996).

(56) References Cited

OTHER PUBLICATIONS

Kyser, G.B., et al., "Effect of timing on chemical control of Dalmatian Toadflax (*Linaria dalmatica*) in California," Invasive Plant Science and Management 6(3):362-370, Cambridge University Press, United Kingdom (2013).
Kyser, G.B., et al., "Control of medusahead (*Taeniatherum caput-medusae*) and other annual grasses with imazapic," Weed Technol. 21(1):66-75, Cambridge University Press, United Kingdom (2007).
Kyser G.B., et al., "Preemergent control of medusahead on California annual rangelands with aminopyralid," Rangeland Ecol. Manage 65(4):418-425, Elsevier, Netherlands (2012).
Kyser, G.B., et al., "Herbicide-assisted restoration of Great Basin sagebrush steppe infested with medusahead and downy brome," Rangeland Ecol. Manage. 66(5):588-596, Elsevier, Netherlands (2013).
Lagator, M., et al., "Herbicide mixtures at high doses slow the evolution of resistance in experimentally evolving populations of Chlamydomonas reinhardtii," New Phytologist. 198(3):938-945, Wiley, United States (2013).
Mack, R.N., "Invasion of *Bromus tectorum* L. into Western North America: an ecological chronicle," Agro-Ecosystems 7(2):145-165, Elsevier, Netherlands (1981).
Mangold, J., et al., "Integrating herbicides and re-seeding to restore rangeland infested by an invasive forb-annual grass complex," Ecological Restoration 33(1):16-19, University of Wisconsin Press, United States (2015).
Mangold, J., et al., "Downy brome (*Bromus tectorum*) control with imazapic on Montana grasslands," Invasive Plant Science and Management 6(4):554-558, Cambridge University Press, United Kingdom (2013).
Meyer, S.E., et al., "Inbreeding, genetic variation, and invasiveness: the strange case of Bromus tectorum," Rangelands 32(1):6-11, University of Arizona, United States (2010).
Monaco, T.A., et al., "Medusahead control with fall- and spring-applied herbicides on northern Utah foothills," Weed Technology 19(3):653-658, Cambridge University Press, United States (2005).
Morghan, R., et al., "Centaurea solstitialis invasion success is influenced by Nassella pulchra size," Restoration Ecology 13(3):524-528, Wiley, United States (2005).
Morris, C., et al., "Variable impacts of imazapic rate on downy brome (*Bromus tectorum*) and seeded species in two rangeland communities," Invasive Plant Science and Management 2(2):110-119, Cambridge University Press, United Kingdom (2009).
Morrow, L.A., et al., "The history and distribution of downy brome (*Bromus tectorum*) in North America," Weed Science 32(Supplement 1):2-6, Cambridge University Press, United Kingdom (1984).
Mueller-Warrant, G, et al., "Primisulfuron Resistance in Downy Brome," in Proc. West Soc. Weed Sci., pp. 16, Weed Science Society of America, United States (1999).
Mutwil, M., et al., "Cellulose synthesis: a complex complex," Curr. Opin. Plant Biol. 11(3): 252-257, Elsevier, Netherlands (2008).
Myers, D., et al., "Indaziflam/BCS AA170717—a new herbicide for preemergent control of grasses and broadleaves in turf and ornamentals," in Proc. South Weed Sci. Soc., pp. 393, Weed Science Society of America, United States (2009).
Nafus, A.M., et al., "Medusahead ecology and management: California annual grasslands to the intermountain west," Invasive Plant Science and Management 7(2):210-221, Cambridge University Press, United Kingdom (2014).
Nagata, T., et al., "Cell wall regeneration and cell division in isolated tobacco mesophyll protoplasts," Planta 92(4):301-308, Springer, United Kingdom (1970).
Washington State University, "National Jointed Goatgrass Research Program (1994-2009): Final Report," accessed at http://jointedgoatgrass.wsu.edu/, accessed Apr. 1, 2023, 32 pages.
Neve, P., "Challenges for herbicide resistance evolution and management: 50 years after Harper," Weed Research 47(5):365-369, Wiley, United States (2007).

Neve, P., et al., "Evolutionary-thinking in agricultural weed management," New Phytologist 184(4):783-793, Wiley, United States (2009).
Nicol, F., et al., "A plasma membrane-bound putative endo-1, 4-13-D-glucanase is required for normal wall assembly and cell elongation in *Arabidopsis*," The EMBO Journal 17(19):5563-5576, European Molecular Biology Organization, United Kingdom (1998).
Northam, F., et al., "New weedy grasses associated with downy brome," in *Proceedings: Ecology and Management of Annual Rangelands*, pp. 211-212, USDA—Forest Service, Intermountain Research Station, United States (1994).
Oba, G., et al., "Relationships between biomass and plant species richness in arid-zone grazing lands," Journal of Applied Ecology 38(4):836-845, British Ecological Society, United Kingdom (2001).
Ogle, S.M., et al., "Impacts of exotic annual brome grasses (*Bromus* spp.) on ecosystem properties of northern mixed grass prairie," The American Midland Naturalist 149(1):46-58, University of Notre Dame, United States (2003).
Oliviera Jr., R.S., et al., "Comparative sorption, desorption and leaching potential of aminocyclopyrachlor and picloram," Journal of Environmental Science and Health, Part B 48(12):1049-1057, Taylor & Francis, United Kingdom (2013).
Paredez, A.R., et al., "Visualization of cellulose synthase demonstrates functional association with microtubule," Science 312(5779):1491-1495, American Association for the Advancement of Science, United States (2006).
Park, K.W., et al., "Multiple herbicide resistance in downy brome (*Bromus tectoram*) and its impact on fitness," Weed Science 53(6):780-786, Cambridge University Press, United Kingdom (2005).
Reece, P.E., et al., "Effect of canada thistle (*Cirsium arvense*) and musk thistle (*Carduus nutans*) control on grass herbage," Weed Science 31(4):488-492, Cambridge University Press, United Kingdom (1983).
Pavek. P., et al., "Ventenata biology and distribution in the Pacific Northwest," in *Proceeding of Western Society of Weed Science*, pp. 107 Western Society of Weed Science, Washington, United States (2011).
Pellant, M., et al., "Distribution of two exotic grasses on intermountain rangelands: status in 1992," in *General Technical Report INT*, pp. 109-112, Intermountain Forest and Range Experiment Station, Forest Service, U.S. Department of Agriculture, United States (1994).
Pester, T.A., et al., "Absorption, translocation, and metabolism of imazamox in jointed goatgrass and feral rye," Weed Science 49(5):607-612, Cambridge University Press, United Kingdom (2001).
Pester, T.A., et al., "Secale cereale interference and economic thresholds in winter Triticum aestivum," Weed Science 48(6):720-727, Cambridge University Press, United Kingdom (2000).
Pimental, D., et al., "Update on the environmental and economic costs associated with alien-invasive species in the United States," Ecological Economics 52(3):273-288, Elsevier, Netherlands (2005).
Powles, S.B., et al., "Evolution in action: plants resistant to herbicides," Annual Review of Plant Biology 61:317-347, Annual Reviews, United States (2010).
Rimer, R., et al., "Invasion of downy brome (*Bromus tectorum* L.) causes rapid changes in the nitrogen cycle," The American Midland Naturalist 156(2):252-258, University of Notre Dame, United States (2006).
Ritz, C., et al., "Relative potency in nonsimilar dose-response curves," Weed Science 54(3):407-412, Cambridge University Press, United Kingdom (2006).
Robocker, W.C., "Seed characteristics and seedling emergence of Dalmatian toadflax," Weed Science 18(6):720-725, Cambridge University Press, United Kingdom (1970).
Rodney, G.L., et al., "Effect of Glyphosate on Introduced and Native Grasses," Weed Technol. 5(2):421-425, Cambridge University Press, United Kingdom (1991).
Rose, K.K., et al., "Competitive effects of cool-season grasses on re-establishment of three weed species," Weed Technol. 15(4):885-891, Cambridge University Press, United Kingdom (2001).
Sabba, R.P., et al., "Herbicides that inhibit cellulose biosynthesis," Weed Science 47(6):757-763, Cambridge University Press, United Kingdom (1999).

(56) References Cited

OTHER PUBLICATIONS

SAS Institute, "SAS/STAT 9.3 User's Guide," SAS Institute, Inc., United States, accessed at https://support.sas.com/documentation/onlinedoc/stat/930/statug.pdf, accessed on Apr. 1, 2023, 8640 pages (2010).
Schneider, C.A., et al., "NIH Image to ImageJ: 25 years of image analysis," Nat. Methods 9(7):671-675, Nature Publishing Group, United Kingdom (2012).
Sebastian, D.J., et al., "Winter annual grass control and remnant plant community response to indaziflam and imazapic," in *Proceedings of Western Society of Weed Science*, pp. 54-55, Western Society of Weed Science, Albuquerque, New Mexico, United States (2016).
Sebastian, D.J., et al., "Indaziflam: potential new herbicide to control invasive winter annual grasses," in *Proceedings of Weed Science Society of America*, Weed Science Society of America, San Juan, Puerto Rico (2015).
Sebastian, D.J., et al., "Influence of soil properties and soil moisture on the efficacy of indaziflam and flumioxazin on *Kochia scoparia* L," Pest Management Science 73(2):444-451, Wiley, United States (2017).
Sebastian, D.J., et al., "Downy brome control on Colorado rangeland with imazapic," Western Society of Weed Science Progress Report, Western Society of Weed Science, Colorado, United States, 1 page (2004).
Sebastian, D.J., et al., "Using aminocyclopyrachlor to control Dalmatian toadflax and promote native plant community recovery and diversity," in *Proceeding of Western Society of Weed Science*, pp. 51-52, Western Society of Weed Science, United States (2012).
Sebastian, D.J., et al., "Feral rye control in Colorado," in Proceedings of Western Society of Weed Science, Western Society of Weed Science, United States (2014).
Sheley, R.L., et al., "Preventing Noxious Weed Invasions," WeedAwareness.org, accessed at http://www.weedawareness.org/assets/documents/Preventing%20Noxious%20Weed%20Invasions.pdf, accessed on Apr. 1, 2023, 4 pages.
Sheley, R.L., et al., "Effects of imazapic on target and nontarget vegetation during revegetation," Weed Technol. 21(4):1071-1081, Cambridge University Press, United Kingdom (2007).
Shinn, S.L., et al., "Tolerance of several perennial grasses to imazapic," Weed Technology 18(1):60-65, Cambridge University Press, United Kingdom (2004).
Smith, D.C., et al., "Factors affecting Bromus tectorum seed bank carryover in western Utah," Rangeland Ecology and Management 61(4):430-436, Elsevier, Netherlands (2008).
Thill, D.C., et al., "The biology of downy brome (*Bromus tectorum*)," Weed Science 32:7-12, Cambridge University Press, United Kingdom (1984).
United States Environmental Protection Agency, "Pesticide Fact Sheet: Indaziflam," issued Jul. 26, 2010, accessed at https://www3.epa.gov/pesticides/chem_search/reg_actions/registration/fs_PC-080818_26-Jul-10.pdf, accessed on Apr. 1, 2023, 108 pages.
Tranel, P.J., et al., "Resistance of weeds to ALS-inhibiting herbicides: what have we learned?" Weed Science 50(6):700-712, Cambridge University Press, United Kingdom (2002).
United States Department of Agriculture—Natural Resources Conservation Survey, "Web Soil Survey," last modified Jul. 31, 2019, accessed at http://websoilsurvey.nrcs.usda.gov/, accessed on Apr. 1, 2023, 2 pages.
United States Fish and Wildlife Service, "Greater sage-grouse," accessed at https://www.fws.gov/species/greater-sage-grouse-centrocercus-urophasianus, accessed on Apr. 2, 2023, 2 pages.
Varanasi, A., et al., "Impact of climate change factors on weeds and herbicide efficacy," Advances in Agronomy 135:107-146, Elsevier, Netherlands (2016).
Vaughn, K.C., et al., "Mitotic disrupter herbicides," Weed Science 39(3):450-457, Cambridge University Press, United Kingdom (1991).
Wallace, J.M., et al., "Herbicide control strategies for Ventenata dubia in the Intermountain Pacific Northwest," Invasive Plant Science and Management 9(2):128-137, Cambridge University Press, United Kingdom (2016).
Wallace, J.M., et al., "Ecological characteristics of Ventenata dubia in the Intermountain Pacific Northwest," Invasive Plant Science and Management 8(1):57-71, Cambridge University Press, United Kingdom (2015).
Watson, A., et al., "The biology of Canadian weeds.: 6. Centaurea diffusa and C. maculosa," Canadian Journal of Plant Science 54(4):687-701, University of British Columbia, Canada (1974).
Western Association of Agricultural Experiment Station Directors, Coordinating Committee 077(2009-2014), "Managing invasive weeds in wheat," accessed at https://www.waaesd.org/wp-content/uploads/2015/12/WERA77_Impact-Summary_FINAL20151130.pdf, accessed on Apr. 1, 2023, 2 pages.
Western Regional Climate Center, "Cooperative Climatological Data Summaries," accessed at http://www.wrcc.dri.edu/climatedata/climsum/, accessed Apr. 1, 2023, 1 page.
Whisenant, S.G., "Changing fire frequencies on Idaho's Snake River Plains: ecological and management implications," in *Proceedings—Symposium on Cheatgrass Invasion, Shrub Die-off and Other Aspects of Shrub Biology and Management*, pp. 4-10, Intermountain Research Station, Forest Service, United States Department of Agriculture, United States (1990).
White, A.D., et al., "Feral rye (Secale cereale) in agricultural production systems," Weed Technology 20(3):815-823, Cambridge University Press, United States (2006).
Whitson, T.D., et al., "Effects of herbicides on grass seed production and downy brome (*Bromus tectorum*)," Weed Technology 11(4):644-648, Cambridge University Press, United Kingdom (1997).
Wicks, G., et al., "Influence of soil type and depth of planting on downy brome seed," Weed Science 19(1):82-86, Cambridge University Press, United Kingdom (1971).
Wilson, L.M., et al., "Biology and biological control of Dalmatian and yellow toadflax," Forest Health Technology Enterprise Team, US Department of Agriculture, Forest Service, United States (2005).
Wolfe, K.H., et al., "Date of the monocot-dicot divergence estimated from chloroplast DNA sequence data," Proceedings of the National Academy of Sciences 86(16):6201-6205, National Academy of Sciences, United States (1989).
Wolff, B., "North Africa grass," in Field Guide 2013, pp. 71-73, Wyoming Weed Watchlist, United States (2013).
Weed Science Society of America, *Herbicide Handbook*, Tenth Edition, Shaner, D.L., ed., Weed Science Society of America, Lawrence, Kansas, United States (2014).
Young, J.A., et al., "Impact of Alien Plants on Grant Basin Rangelands," Weed Technology 10(2):384-391, Cambridge University Press, United Kingdom (1996).
Young, J.A., "Ecology and management of medusahead (*Taeniatherum caput-medusae* ssp. asperum Melderis)," The Great Basin Naturalist 52(3):245-252, Cambridge University Press, United Kingdom (1992).
Young, J.A., et al., "Population dynamics of downy brome," Weed Science 17(1):20-26, Cambridge University Press, United Kingdom (1969).
Zouhar, K., et al., "Wildland fire in ecosystems: fire and nonnative invasive plants," Rocky Mountain Research Station, United States Department of Agriculture, United States (2008).
Bayer CropScience and Wyoming Department of Agriculture, Wyoming Emergency Exemption Request 2017, Indaziflam (Esplanade 200 SC) EPA # 432-151; published Feb. 23, 2018, 32 pages.
Havstad, K.M., et al., "Ecological services to and from rangelands of the United States," Ecol. Econ. 64:261-268, Elsevier, Netherlands (2007).
Kyser, G.B., et al., "Medusahead Management Guide for the Western States," USDA Agricultural Research Service, US Department of Agriculture, United States (2014).
Rejmanek, M., et al., "When is eradication of exotic pest plants a realistic goal?" pp. 249-253 in *Turning the tide: The eradication of invasive species*, Veitch, C.R. and Clout, M.N., eds., IUCN SSC Invasive Species Specialist Group, Gland, Switzerland (2002).
Fryer, J.L., "Ventenata dubia," Fire Effects Information System [Online], United States Department of Agriculture, Forest Service, Rocky Mountain Research Station, United States (2017).
Scheinost, P., et al., "Ventenata. Plant Guide," USDA NRCS Pullman Plant Materials Center, United States (2008).

(56) References Cited

OTHER PUBLICATIONS

Wallace, T., et al., presentation slides entitled "Biology & Control of Ventenata in Perennial Grass Systems," 2015, accessed at https://www.uidaho.edu/~/media/UIdaho-Responsive/Files/Extension/county/nez-perce/Ag-handouts/Summary-on-Ventenata-Biology-and-Management-2015.ashx, 33 pages.

U.S. Environmental Protection Agency, "Indaziflam—Aggregate Human Health Risk Assessment of Proposed New Uses, Crop Group Conversions, and Expansions from Representative Commodities to Crop Groups," published Jul. 5, 2017, internally posted May 17, 2017, accessed at https://www.regulations.gov/document/EPA-HQ-OPP-2016-0166-0010, 39 pages.

U.S. Environmental Protection Agency, "Drinking Water Exposure Assessment for Section 3 New Uses of Indaziflam on Blueberry (Highbush), Cranberry, Caneberry, Coffee, and Hops," published Jul. 5, 2017, internally posted Nov. 21, 2016, accessed at https://www.regulations.gov/document/EPA-HQ-OPP-2016-0166-0008, 26 pages.

U.S. Environmental Protection Agency, "Indaziflam: Acute and Chronic Aggregate (Food and Drinking Water) Dietary Exposure and Risk Assessments for Proposed New Section 3 Uses of the Herbicide on Bushberries, Caneberries, Coffee, and Hops, Along with Crop Group Conversion and Expansions," published Jul. 5, 2017, internally posted Dec. 20, 2016, accessed at https://www.regulations.gov/document/EPA-HQ-OPP-2016-0166-0007, 18 pages.

United States Environmental Protection Agency, "Guidance for Identifying Pesticide Chemicals and Other Substances that have a Common Mechanism of Toxicity," United States Environmental Protection Agency, United States (Jan. 29, 1999).

United States Environmental Protection Agency, "Guidance on Cumulative Risk Assessment of Pesticide Chemicals that have a Common Mechanism of Toxicity," United States Environmental Protection Agency, United States (Jan. 14, 2002).

United States Environmental Protection Agency Product Label, "Indaziflam Technical," EPA Reg. No. 264-1129, Bayer CropScience LP, Jul. 5, 2017, 6 pages.

United States Environmental Protection Agency Product Label, "Indaziflam GRZ," EPA Reg. No. 432-1609, Bayer Environmental Science, Apr. 20, 2020, 11 pages.

United States Environmental Protection Agency Product Label, "Rezilon," EPA Reg. No. 432-1610, Bayer Environmental Science, Jun. 15, 2020, 14 pages.

United States Environmental Protection Agency Product Label, "Indaziflam G," EPA Reg. No. 432-1523, Bayer Environmental Science, May 7, 2014, 22 pages.

United States Environmental Protection Agency Product Label, "Specticle FLO," EPA Reg. No. 432-1608, Bayer Environmental Science, Apr. 17, 2019, 22 pages.

United States Environmental Protection Agency Product Label, "Specticle G", EPA Reg. No. 432-1523, Bayer Environmental Science, 14 pages.

Unpublished, copending U.S. Appl. No. 18/049,943, filed Oct. 26, 2022.

Declaration of Stevan Knezenic, Ph.D., in support of Petition for Post-Grant Review, filed Aug. 8, 2022, of U.S. Pat. No. 11,166,463, issued Nov. 9, 2021, Adama Appendix A, 86 pages.

Specification filed for U.S. Appl. No. 16/710,965, filed Dec. 11, 2019, "Herbicidal Compositions for Animal Grazelands and Methods for Applying the Same," Adama Exhibit 1004, 32 pages.

Pesticide Fact Sheet Name of Chemical: Indaziflam, Date Issued: Jul. 26, 2010, Adama Exhibit 1005, 108 pages.

"Registration of Indaziflam on Citrus, Stone, and Pome Fruit, Grapes, Tree Nuts, Pistachios, and Olives," Mar. 24, 2011, Adama Exhibit 1006, 14 pages.

United States Environmental Protection Agency, Summary of Aoalytical Chemistry and Residue Data, Indaziflam. Petition for the Establishment of Permanent Tolerances and Registration, Sep. 9, 2010, Adama Exhibit 1007, 52 pages.

United States Environmental Protection Agency, Subject: Indaziflam: Human Health Risk Assessment for Use in Citrus, Stone, and Pome Fruits; Grapes; Tree Nuts; Pistachios; Olives; and Sugar Cane (Imported Refined Sugar), Adama Exhibit 1008, Sep. 16, 2010, 50 pages.

Alion TM Herbicide, for Preemergent Weed Control in Citrus Fruit, Stone Fruit, Pome Fruit, Tree Nuts and Pistachios Group 29 Herbicide, EPA Reg. No.: 264-1106, Adama Exhibit 1009, Apr. 7, 2011, 9 pages.

United States Environmental Protection Agency, Label Amendment (incorporate supplemental label, remove WPS sections, remove IVM acronym, add use near office buildings) Esplanade 200 SC Herbicide EPA Reg. No. 432-1516, Application Dated Apr. 4, 2012, May 1, 2012, 9 pages.

United States Environmental Protection Agency, Pesticide Registration, Adama Exhibit 1011, Feb. 15, 2022, 10 pages.

Dissertation Indaziflam: A New Cellulose Biosynthesis Inhibiting Herbicide Provides Long-Term Control of Invasive Winter Annual Grasses, Submitted by Derek James Sebastian Department of Bioagricultural Sciences and Pest Management, In partial fulfillment of the requirements for the Degree of Doctor of Philosophy Colorado State University Fort Collins, Colorado, Spring 2017, Adama Exhibit 1012, 114 pages.

Montana IPM Bulletin, Managemenl of wireworms: Present status, Montana State University, Spring 2019, Adama Exhibit 1013, 8pages.

United States Environmental Protection Agency, Indaziflam—Human Health Risk Assessment of the Section 18 Specific Exemption for Use on Rangeland Grasses in Wyoming, Aug. 30, 2017, Adama Exhibit 1014, 18 pages.

United States Environmental Protection Agency, Indaziflam. Petition for the Establishment of Permanent Tolerances and Registration, for Use on Crop Group 17 (Forage and Hay) and Sugarcane, and Establishment of Tolerances for Ruminant Commodities. Summary of Analytical Chemistry and Residue Data, Apr. 15, 2020, Adama Exhibit 1015, 196 pages.

United States Environmental Protection Agency, Indaziflam—Human Health Risk Assessment of the Section 18 Sepecific Exemption for Use on Rangeland Grasses in Wyoming, Aug. 30, 2017, Adama Exhibit 1016, 18 pages.

Federal Register, Rules and Regulations, Indazlflam; Pesticide Tolerances, vol. 85, No. 122, Wednesday, Jun. 24, 2020, Adama Exhibit 1017, 4 pages.

U.S. Environmental Protection Agency, Notice of Pesticide: EPA Reg. No. 432-1609, Registration, Name of Pesticide Product: Indaziflam GRZ, Bayer Crop Science, Jun. 15, 2020, Adama Exhibit 1018, 14 pages.

Classified for "Restricted Use" in New York State under 6NYCRR Part 326, Doc id: 570416, EsplAnade® 200 SC, Bayer, Indaziflam Group Ea Herbicide, Adama Exhibit 1019, Nov. 3, 2020, 7 pages.

U.S.Environmental Protection Agency, Notice of Pesticide Registration, Name of Pesticide Product: Rezilonepa, Reg. No. 432-1610, Adama Exhibit 1020, Jun. 15, 2000, 14 pages.

Notice of Allowance issued in U.S. Appl. No. 16/710,965, dated Jul. 9, 2021, Adama Exhibit 1021, 9 pages.

Canadian Study, Proposed Registration Decision, Indaziflam, PRD2011-20, Adama Exhibit 1022, Oct. 7, 2011, 106 pages.

Calculations of Stevan Knezenic, Ph.D., in support of Petition for Post-Grant review, filed Aug. 8, 2022, of U.S. Pat. No. 11,166,463, issued Nov. 9, 2021, Adama Exhibit 1023, 5 pages.

Sebastian et al., "A Potential New Herbicide for Invasive Annual Grass Control on Rangeland," Rangeland Ecology & Management, vol. 69, Adama Exhibit 1024, Available online: Feb. 3, 2016, pp. 195-198 (5 pages).

Sebastian et al., "Indaziflam: a new cellulose-biosynthesis-inhibiting herbicide provides long-term control of invasive winter annual grasses," Pest Manag Sci., Oct. 2017, vol. 73, No. 10, Adama Exhibit 1025, pp. 2149-2162 (2 pages).

Sebastian et al., "Seed Bank Depletion: The Key to Long-Term Downy Brome Bromus tectorum L.) Management" Rangeland Ecology k Management, vol. 70, Issue 4, Jul. 2017, Adama Exhibit 1026, pp. 477-483 (8 pages).

(56) References Cited

OTHER PUBLICATIONS

Sebastian et al., "Pre-emergence Control of Six Invasive Winter Annual Grasses with Imazapic and Indaziflam," Invasive Plant Science and Management, vol. 9 Adama Exhibit 1027, Oct.-Dec. 2016, pp. 308-316 (9 pages).
Sebastian et al., "Preemergence Control of Nine Invasive Weeds with Arninncyclopyrnchlor, Arninopyrnlid, and Indaziflam," Invasive Plant Science and Management, vol. 10, Adama Exhibit 1028, 2017, pp. 99-109 (11 pages).
Indaziflam 200 SC Herbicide label, U.S.Environmental Protection Agency, Notice of Pesticide Registration, Name of Pesticide Product: Indaziflam 200 SC Herbicide, Date of Issuance Apr. 7, 2011, Adama Exhibit 1029, 11 pages.
Imazapic Label, BASF Corporation, Specimen Plateau herbicide, Adama Exhibit 1030, 2011, 15 pages.
Sebastian, Derek James, "Indaziflam: a new cellulose biosynthesis inhibiting herbicide provides long-term control of invasive winter annual grasses," Jun. 9, 2017, Adama Exhibit 1031, 4 pages.
Human Health Risk Assessment of the Section 18 Specific Exemption for Use on Rangeland Grasses in Wyoming, Posted by the Environmental Protection Agency on Feb. 23, 2018, Adama Exhibit 1032, 3 pages.
Kessler, K. C. "Litter Reduction by Prescribed Burning Can Extend Downy Brome Control." Master's Thesis, Colorado State University, 2014.
Sebastian, D.J., et al., "Comparing Indaziflam and Imazapic for Downy Brome and Feral Rye Control in Range and Pasture," in Proceedings of Western Society of Weed Science, Western Society of Weed Science, United States (2015).
Environmental Protection Agency, "Indaziflam; Pesticide Tolerances for Emergency Exemptions", Federal Register vol. 83, No. 37 (Feb. 23, 2018), 7998-8002.
International Search Report and Written Opinion of the International Searching Authority for PCT International Patent Application No. PCT/US2019/062634, dated Mar. 9, 2020, 8 pages.
Barr, C., and Pfeifer, M., "MSMA {Monosodium Methyl Arsenate) is Not for Pasture Use," Aug. 9, 2019, Texas A&M Veterinary Medical Diagnostic Laboratory, 4 pages. Retrieved on Jun. 25, 2021, URL: https://tvmdl.tamu.edu/2019/08/09/msma-monosodium-methyl-arsenate-is-not-for-pasture-use/.
International Search Report and Written Opinion of the International Searching Authority for PCT International Patent Application No. PCT/US2018/025849, dated Jun. 1, 2018, 13 pages.
Brabham et al., "Indaziflam Herbicidal Action: A Potent Cellulose Biosynthesis Inhibitor"; Plant Physiology, Nov. 2014, vol. 166, pp. 1177-1185, XP002778008.
Ahrens et al., "Indaziflam: An Innovative Broad Spectrum Herbicide"; Nov. 2015; ACS Symposium Series; American Chemical Sosiety/Oxford University Press; pp. 233-245; XP055458937.
Ta Teno et al., "Cellulose biosynthesis inhibitors—a multifunctional toolbox"; Journal of Experimental Botany; vol. 67, Issue 2; Jan. 2016; pp. 533-542.
Hollingsworth et al., "Control of Saltcedar by Subsurface Placement of Herbicides"; Journal of Range Management, vol. 32, No. 4; Jul. 1, 1979, pp. 288-291, XP055476992.
Heim et al., Triazofenamide Is a Cellulose Biosynthesis Inhibitor; Pesticide Biochemistry and Physiology vol. 59, 1998; pp. 163-168; XP055476993.
International Search Report and Written Opinion of the International Searching Authority for PCT International Patent Application No. PCT/US2018/013698; dated Apr. 3, 2018, 9 pages.
Acebes et al., "Cellulose Biosynthesis Inhibitors: Their Uses as Potential Herbicides and as Tools In Cellulose and Cell Wall Structural Plasticity Research"; In: Cellulose: Structure and Properties; Mar. 26, 2015; pp. 39-73; XP055459001.

HERBICIDAL COMPOSITIONS FOR ANIMAL GRAZELANDS AND METHODS FOR APPLYING THE SAME

CROSS REFERENCE TO RELATED APPLICATIONS

This application is a continuation of U.S. patent application Ser. No. 18/151,076, filed Jan. 6, 2023, which is a continuation of U.S. patent application Ser. No. 17/737,451, filed May 5, 2022, which is a division of U.S. patent application Ser. No. 17/675,825, filed Feb. 18, 2022, now U.S. Pat. No. 11,849,730, issued Dec. 26, 2023, which is a continuation of U.S. patent application Ser. No. 17/496,243, filed Oct. 7, 2021, now U.S. Pat. No. 11,800,870, issued Oct. 31, 2023, which is a continuation of U.S. patent application Ser. No. 16/710,965, filed Dec. 11, 2019, now U.S. Pat. No. 11,166,463, issued Nov. 9, 2021, which in turn is a continuation of PCT International Patent Application No. PCT/US2019/062634, filed Nov. 21, 2019, which claims priority to U.S. Provisional Patent Application No. 62/773,037, filed Nov. 29, 2018. Each of these applications is incorporated by reference in their entirety.

FIELD

The disclosure provides for methods and compositions for controlling unwanted vegetation in areas in which animals graze.

BACKGROUND

There is an ongoing need for agronomic solutions which are safe for use in areas, such as rangelands, pastures, natural areas, and other non-crop areas, in which grazing animals feed.

Invasive species cost the United States billions of dollars annually and disrupt natural ecosystems. Across the U.S., invasive plants are estimated to occur on 7 million acres of national park lands, and at least 1.5 million acres are severely infested. In addition to federal lands, state and private lands are also plagued with invasive plants and may have even higher infestation rates.

Grazing animals such as cattle, and species such as the greater sage-grouse which are to be protected under active conservation efforts, are threatened by invasive plant species, which negatively impact habitats and food sources. More generally, invasive plant species threaten to reduce the functional diversity of native vegetation.

Rangeland areas heavily invaded by invasive grass species, for example, suffer a loss of grazing capacity of up to 80% and, therefore, a reduction in livestock production of up to 80%. Additionally, invasive grasses have a notably deleterious effect on hay production, both in terms of hay yield and management costs incurred by farmers.

Such invasive grass species further increase annual thatch deposition and accumulation. Increased thatch promotes increased fire size and frequency and reduce fire cycles by shifting discontinuous fire systems into horizontally continuous systems, thereby further endangering rangeland and livestock. Specifically, invasive grasses produce significant amounts of dead, above-ground biomass, e.g., thatch, which can accelerate wildfire in both rangeland and in cropland. The dead, above-ground biomass comprises a fine, dense mat of highly flammable fuel susceptible to ignition and thus accelerating fire cycles. Accordingly, fire size and frequency have increased dramatically with the expansion of annual grass weed infestations. In addition to disrupting ecology and ecosystem, fire can be devastating to rangeland and standing crops and the domestic and wild animals which feed thereon. Additionally, wildfire leaves the soil more vulnerable to erosion and runoff.

Furthermore, there is an increasing demand for grass-fed livestock over, for example, grain- or corn-fed livestock. Rangeland supports a substantial portion of livestock production in the United States and, therefore, state economies. For example, approximately 65% of Wyoming's agricultural production is cattle and 86% is livestock. Accordingly, there is a need for agronomic compositions and methods for applying the same to grass, wherein the treated vegetation is safe for animal consumption and which do not contaminate the animal's meat or milk for later human or animal (e.g., pet) consumption.

Invasive grasses and weeds compete for nutrients and grow in spaces with native species suitable for grazing animals, such as perennial forbs and perennial grasses. By controlling invasive grasses and other weeds, rangeland can be more productive and therefore support more cattle and other grazing animals.

Additionally, various weed species can be harmful to grazing animals, such as sandbur (*Chenchrus longispinus*), which is thorny and can cause cuts on grazing animals which may lead to infections. Further examples of invasive grasses and/or weeds which may be harmful to grazing animals include Japanese brome (*Bromus japonicus*), milkweed (*Asclepias* spp.), and poison hemlock (*Conium maculatum*).

Although herbicides are available, most are expensive, vary in effectiveness, and do not reduce the seed bank of invasive plants. In addition, seed bank longevity is typically underestimated, and some seeds can remain in the soil for years. There are limited herbicide options that provide the long-term control necessary to deplete the soil seed bank of invasive weed seed.

The present inventors have found that methods and compositions described herein effectively control invasive vegetation and grasses in areas in which livestock graze while the treated vegetation is safe for consumption by livestock animals.

SUMMARY

The present invention provides for a method of treating an area comprising applying to said area a composition comprising a cellulose biosynthesis inhibitor, wherein one or more animals graze or are intended to graze in said area.

The present invention further provides for methods of treating an area comprising applying to said area a composition comprising a cellulose biosynthesis inhibitor, wherein one or more animals graze or is intended to graze in said area, and wherein the milk of said animal(s) is to be consumed by humans, dogs, cats or other mammals.

The present invention further provides for methods of treating an area comprising applying to said area a composition comprising a cellulose biosynthesis inhibitor, wherein one or more animals graze or is intended to graze in said area, and wherein the meat of said animal(s) is to be consumed by humans, dogs, cats or other mammals.

It has been found that compositions comprising indaziflam as an active ingredient may be safely applied to areas in which animals graze, such as rangeland and pastures, without risk of contaminating the meat of, or milk produced by, the grazing animals.

Further objects, features, and advantages of the invention will become apparent from the detailed description that follows.

DETAILED DESCRIPTION

Herbicidal compositions comprising cellulose biosynthesis inhibitors, such as indaziflam, are commonly used to control pests such as annual grasses and broadleaf weeds. Indaziflam works well against, for example, medusahead, ventenata, crabgrass, goosegrass, kyllinga, bluegrass, doveweed, swinecress, bittercress and henbit, including all weeds listed on the labels of the commercial products.

Cellulose biosynthesis inhibitor herbicides affect synthesis of the cellulose needed for cell walls in susceptible plants, thereby inhibiting cell division. These herbicides are absorbed through susceptible plants' roots and shoot tissues and inhibit root and shoot growth.

A person having ordinary skill in the art would understand how to adjust dosages and concentrations depending on whether the composition is to be applied to a desirable plant or seed, part or habitat thereof, or directly to a site in which no desirable plants are present or growing (e.g., a monoculture of unwanted annual grass).

Compositions comprising indaziflam have been recognized as being suitable for generally controlling and inhibiting undesired vegetative growth of plants from seed without simultaneously killing the desirable crop plants.

The compound, indaziflam, which can be used in the presently claimed method, is described in, for example, U.S. Pat. No. 8,114,991, which is hereby incorporated by reference in its entirety. The compound taught by U.S. Pat. No. 8,114,991, is described therein as having herbicidal properties. See U.S. Pat. No. 8,114,991, at, for example, column 62, line 22 to column 72, line 43.

Indaziflam's International Union of Pure and Applied Chemistry (IUPAC) name is N2-[(1R,2S)-2,3-dihydro-2,6-dimethyl-1H-inden-1-yl]-6-[(1RS)-1-fluoroethyl]-1,3,5-triazine-2,4-diamine. Indaziflam is written chemically as $C_{16}H_{20}FN_5$ and has the following structural formula:

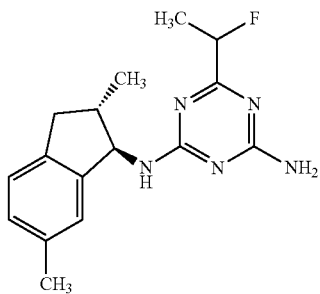 [SMILES: Cc1ccc2c(c1)[C@H](Nc1nc(N)nc(C(C)F)n1)[C@@H](C)C2]

Indaziflam controls weeds by inhibiting cellulose biosynthesis and meristematic cell growth and is classified as a Group 29 Herbicide (see: wssa.net/wp-content/uploads/WSSA-Mechanism-of-Action.pdf) by the Weed Science Society of America. The discovery that indaziflam is effective on rangeland and pasture, will assist land managers battling herbicide resistant weeds because indaziflam would be a new herbicide site of action for this market.

As a cellulose-biosynthesis inhibitor, indaziflam has been found to have a unique mode of action for non-crop areas with residual soil activity and broad-spectrum pre-emergence) control. In addition, indaziflam is more lipophilic with a water solubility of 3.6 mg $L^{-1}$ and log $K_{ow}$ of 2.8 (pH 7) than aminocyclopyrachlor, aminopyralid, imazapic, and picloram, which have water solubility in the range of (2,200 to 207,000 mg $L^{-1}$) and log $K_{ow}$ (−2.87 to 1.18). Thus, indaziflam may have less herbicide dilution in the soil profile and longer-term soil residual activity. Therefore, in view of this longer-term activity, indaziflam can be used effectively to treat grazeland is especially beneficial. Further, use of indaziflam is economical because the recommended non-crop use rates are relatively low for indaziflam, e.g., 73 to 102 g ai $ha^{-1}$, which is comparable to imazapic (70 to 123 g ai ha 1), aminocyclopyrachlor (70 to 140 g ai ha 1), aminopyralid (53 to 123 g·ai·$ha^{-1}$), and is much less than picloram, (140 to 1,121 g·ai·$ha^{-1}$).

Additional cellulose biosynthesis inhibitors include herbicides belonging to benzamide (WSSA group 21), nitrile (WSSA group 20), and triazolocarboxamides (WSSA group 28) classes of chemicals. For example, cellulose biosynthesis inhibitors of the benzamide family include isoxaben. Cellulose biosynthesis inhibitors of the nitrile family include dichlobenil and chlorthiamid. Cellulose biosynthesis inhibitors of the triazolocarboxamide family include flupoxam.

Commercially available herbicides incorporating indaziflam as their active ingredient include, for example, the REJUVRA™ product, the REJUVRA PLUS™ product, the REZILON™ product, the ALION® product, the ESPLANADE® F product, the ESPLANADER EZ product, the ESPLANADE® 200 SC product, the SPECTICLE® G product, the SPECTICLE® FLO product, the SPECTICLE® TOTAL, the SPECTICLE® 20 WSP product, the MARENGO® product, and the DURAZONE® product. Any of these with appropriate labeling can be used in the present invention.

The REJUVRA™ product, for example, is formulated as a suspension concentrate containing 1.67 lb. ai per gallon (200 g ai/L) indaziflam. Bayer CropScience has applied for its registration on rangeland areas in the Western U.S. at rate between 3.5 to 5 fl. oz/A (0.046 to 0.065 lb. ai/A). This invention allows for the the broad spectrum, preemergence control of invasive and noxious annual grass and broadleaf weeds in areas that may be grazed by domestic livestock or cut for hay. Indaziflam provides long-term control of invasive annual grasses such as downy brome (also called cheatgrass), medusahead, and ventenata and broadleaf weeds such as common mullein and marestail.

The REZILON™ Herbicide product, for example, is also formulated as a suspension concentrate containing 1.67 lb. ai per gallon (200 g ai/L) indaziflam. The REZILON™ product can be applied at rates between 3 to 5 fl. oz/A (0.039 to 0.065 lb. ai/A) for broad spectrum annual grass and broadleaf weed control including hard-to-control and/or herbicide resistant weeds such as Italian ryegrass, crabgrass species, foxtail species, sandbur, horseweed, and pigweed species.

Indaziflam is an herbicide for pre-emergence control of annual grass and broadleaf weeds, including those that are invasive, on rangeland, Conservation Reserve Program (CRP) lands and warm season pasture and hay production areas.

Indaziflam has been found to provide extended residual pre-emergence control of the most common and economically important invasive annual grasses and broadleaf weeds, including populations that are resistant to glyphosate and acetolactate synthase (ALS)-inhibiting herbicides. Indaziflam should generally be applied and activated by rainfall before it will control germinating seedlings. A tank mix partner may be used to provide first-year control of germinating weeds if the application is after target weeds have already germinated or if insufficient precipitation to activate indaziflam is expected prior to weed germination. Suitable tank mix partners include glyphosate, imazapic, rimsulfuron, and propoxycarbozone.

Indaziflam has been found to offer significant advantages to ranchers and forage producers compared to currently registered herbicides., indaziflam has been found to provide excellent crop tolerance and longer residual control of annual invasive grass weed species compared to all other registered products tested. In rangeland, ranchers can utilize indaziflam to release native vegetation by controlling annual invasive grass species such as cheatgrass, medusahead and ventenata. In some regions of the Western U.S., particularly the sage-steppe ecosystem found in the Great Basin, invasive annual grasses such as cheatgrass are threatening this rich and diverse ecosystem. Cheatgrass infestation, due to the buildup of fine fuel, has led to increased frequency of wildfires which destroy perennial grasses and sagebrush. Many wildlife species, including the sage grouse (which is under an intensive conservation program), are dependent on the perennial grass and sagebrush ecosystem for survival. By only using current technologies and practices, it is estimated that in 30 years we will have five times more cheatgrass dominated areas in the Great Basin than today. Other invasive grasses such as medusahead and ventenata also pose significant issues due to their high silica content that renders them much less palatable to livestock. This causes livestock grazing pressure of the more palatable and desired native grasses to increase, even to the point of over grazing. In the absence of effective control measures, these invasive weeds are allowed to expand their populations, while increasing grazing pressure reduces the populations of desirable native vegetation. For these reasons, invasive grass species such as these are very highly undesirable.

It has been found that a single application of indaziflam can prevent germination of annual grasses for multiple years. This provides land managers with a new opportunity to start the process of eliminating the annual grass seed bank. For example, indaziflam has demonstrated long-term control, (e.g., at least three years) of cheatgrass with a single application. Indaziflam is significantly more effective as a pre-emergence herbicide than imazapic on cheatgrass, medusahead, and ventenata. This makes indaziflam an effective tool to start the process of depleting the invasive annual grass soil seed bank. Furthermore, providing long-term control of annual grasses with indaziflam results in both reduced thatch that serves as fuel for highly destructive wildfires, and the effective creation of firebreaks that protect communities of desirable perennials. As a result, native ecosystems are promoted, allowing for increased habitat for animal species of concern including wildlife and pollinators.

In certain embodiments, a composition comprising a cellulose biosynthesis inhibitor can be applied according to methods of the present invention at rates of 0.001 to 100, or 0.01 to 75, or 0.1 to 50, or 0.5 to 25 oz/A (ounces of composition per acre).

In certain embodiments, a composition comprising as an active ingredient a cellulose biosynthesis inhibitor is applied according to methods of the present invention such that the cellulose biosynthesis inhibitor is applied in an amount of from 0.001 to 25, or 0.0025 to 10, or 0.005 to 1, or 0.01 to 0.5 lb. ai/A (pounds of active ingredient per acre).

In an aspect, the cellulose biosynthesis inhibitor applied according to the present invention is indaziflam.

In another aspect, indaziflam may be used in combination with one or more additional cellulose biosynthesis inhibitors, which may be applied at rates of 10 to 2000, 20 to 1500, 50 to 1200, 60 to 1000, or 70 to 500 g ai ha 1. The weight ratios of indaziflam to at least one additional herbicide may be 25:1 to 1:25, 1:10 to 10:1, or 5:1 to 1:5.

In certain embodiments of the present invention, a cellulose biosynthesis inhibitor, such as indaziflam, is the only herbicidally active ingredient or only active ingredient in the composition applied. For example, in certain embodiments, the composition used in the method of the present invention does not include other herbicides, fungicides, insecticides, and/or other agriculturally active ingredients.

In certain embodiments, a composition of the present invention can comprise a cellulose biosynthesis inhibitor in an amount of 0.001 to 50 lb./gallon, or 0.01 to 25 lb./gallon, or 0.1 to 10 lb./gallon, or 0.5 to 5 lb./gallon.

In an aspect, a composition of the present invention comprises a cellulose biosynthesis inhibitor in an amount of 0.0001% to 75%, or 0.001% to 50%, or 0.01% to 33%, or 0.1% to 25% by weight of the composition.

In certain embodiments, a composition applied according to the method of the present invention may comprise at least one active ingredient in addition to a cellulose biosynthesis inhibitor, depending on the formulation. In such embodiments, said at least one additional active ingredient may be present in an amount of 0.001 to 50 lb./gallon, or 0.01 to 25 lb./gallon, or 0.1 to 10 lb./gallon.

In an aspect, compositions applied according to the methods described herein may include any desired effective amount of one or more additional active ingredients, such as wherein said one or more additional active ingredients is/are present at a combined concentration of 0.001% to 50%, or 0.01% to 33%, or 0.1% to 25% by weight of the composition.

"Plant health" refers to one or more advantageous properties including: emergence, crop yield, protein content, more developed root system (improved root growth), tillering increase, increase in plant height, increase in size of leaf blade, fewer dead basal leaves and/or fruit, stronger tillers, greener leaf color, pigment content, greater photosynthetic activity, decreased need for fertilizer, decrease in need for seeds, more productive tillers, earlier flowering, earlier grain maturity, less plant verse (lodging), increased shoot growth, enhanced plant vigor, increased plant stand and early germination, drought tolerance, and any other advantages familiar to a person skilled in the art.

"Promote," as used herein in connection with plant health and development, means to advance, increase, facilitate, or otherwise positively impact plant health and/or development, including but not limited to increasing shoot and/or root growth, drought tolerance, and/or fruit yield.

"Habitat" denotes where a desirable plant (e.g., grass to be consumed by grazing animals) or crop is growing or will be grown. The method described herein can be used to treat a desirable plant or crop, or a seed, leaf, part, or habitat thereof.

In an aspect, the habitat of a desirable plant or crop to be treated is rangeland, a pasture, or a natural area as defined herein.

Compositions described herein may be applied according to the method of the present invention to treat any desirable plant or crop, or a seed, leaf, part, or habitat thereof.

In an aspect, compositions described herein may be applied according to the method of the present invention to promote the overall plant health of desirable plants, e.g., grasses growing in rangelands, pastures natural areas, or other non-crop areas to which the compositions are applied.

In another aspect, compositions described herein may be applied according to the method of the present invention to control or kill undesirable plants, e.g., invasive grasses.

In another aspect, compositions described herein may be applied directly to the soil in a rangeland, pasture, natural area, or other non-crop area.

Any desired plant or crop can be treated by the composition of the present invention to control invasive grasses or weeds. In another aspect, compositions of the present invention may be applied directly to invasive grasses or weeds to be controlled.

"Invasive grass", "invasive annual grass", "annual grass", and "annual weed" are used interchangeably herein and are understood as meaning, in the present context any undesired grass or weed species.

In an aspect, methods and compositions of the present invention may be used to control any weed including but not limited to *Abelmoschus esculentus, Abrus precatorius, Abutilon theophrasti, Acacia auriculiformis, Acacia confuse, Acacia mearnsii, Acacia melanoxylon, Acacia paradoxa, Acacia parramattensis, Acaena novae-zelandiae, Acaena pallida, Acalypha ostryifolia, Acalypha virginica, Acanthospermum hispidum, Acer ginnala, Acer negundo, Acer platanoides, Acer pseudoplatanus, Acer rubrum, Achillea millefolium, Achillea millefolium* var. *occidentalis, Achnatherum brachychaetum, Acroptilon repens, Adenanthera pavonina, Aegilops cylindrica, Aegilops geniculate, Aegilops triuncialis, Aeginetia, Aegopodium podagraria, Aeschynomene indica, Aeschynomene rudis, Aeschynomene virginica, Agave sisalana, Ageratina adenophora, Ageratina altissima* var. *altissima, Ageratina riparia, Ageratum conycoides, Agrostemma githago, Agrostis.stolonifera, Ailanthus altissima, Albizia julibrissin, Albizia lebbeck, Alectra, Alhagi maurorum, Alliaria petiolata, Allium, Allium canadense, Allium neapolitanum, Allium paniculatum, Allium textile, Allium vineale, Allium vineale* ssp. *compactum, Alnus glutinosa, Alopecurus carolinianus, Alopecurus myosuroides, Alstonia macrophylla, Alternanthera, Alternanthera philoxeroides, Alternanthera pungens, Alternanthera sessilis, Alyssum alyssoides, Amaranthus albus, Amaranthus blitoides, Amaranthus hybridus, Amaranthus palmeri, Amaranthus powellii, Amaranthus retroflexus, Amaranthus spinosus, Amaranthus tuberculatus, Amaranthus viridis, Ambrosia acanthicarpa, Ambrosia artemisiifolia, Ambrosia artemisiifolia* var. *elatior, Ambrosia grayi, Ambrosia psilostachya, Ambrosia tomentosa, Ambrosia trifida, Ammannia coccinea, Ammophila arenaria, Amorpha fruticosa, Ampelopsis brevipedunculata, Amphiachyris dracunculoides, Amsinckia calycina, Amsinckia menziesii* var. *intermedia, Anagallis arvensis, Anchusa arvensis, Anchusa officinalis, Andropogon bicornis, Andropogon gerardii, Andropogon virginicus, Anemone hupehensis, Angiopteris evecta, Anoda cristata, Anredera cordifolia, Anredera vesicaria, Anthemis arvensis, Anthemis cotula, Anthriscus sylvestris, Antigonon leptopus, Apocynum androsaemifolium, Apocynum cannabinum, Arabidopsis thaliana, Araujia sericifera, Archontophoenix alexandrae, Arctium minus, Arctotheca calendula, Ardisia crenata, Ardisia elliptica, Argemone mexicana, Argemone polyanthemos, Aristida oligantha, Aristida purpurea, Aristolochia elegans, Arrhenatherum elatius* var. *bulbosum, Artemisia absinthium, Artemisia annua, Artemisia biennis, Artemisia campestris, Artemisia cana, Artemisia dracunculus, Artemisia filifolia, Artemisia frigida, Artemisia ludoviciana, Artemisia tridentata, Artemisia vulgaris, Arthraxon hispidus, Arthrostemma ciliatum, Arundo donax, Asclepias fascicularis, Asclepias incarnata, Asclepias labriformis, Asclepias physocarpa, Asclepias speciosa, Asclepias subverticillata, Asclepias syriaca, Asclepias verticillata, Asparagus aethiopicus, Asphodelus fistulosus, Astragalus bisulcatus, Astragalus missouriensis, Astragalus mollissimus, Asystasia gangetica, Atriplex semibaccata, Atriplex subspicata, Avena barbata, Avena fatua, Avena sativa, Avena sterilis, Axonopus fissifolius, Azolla pinnata, Bacopa rotundifolia, Barbarea orthoceras, Barbarea vulgaris, Bassia hyssopifolia, Bassia scoparia, Bauhinia variegata, Begonia cucullata, Bellardia trixago, Bellis perennis, Berberis, Berberis thunbergii, Berberis vulgaris, Berteroa incana, Bidens alba, Bidens aristosa, Bidens bipinnata, Bidens cernua, Bidens cynapiifolia, Bidens frondosa, Bidens pilosa, Bischofia javanica, Bocconia frutescens, Bouteloua dactyloides, Brachypodium distachyon, Brachypodium sylvaticum, Brassica, Brassica juncea, Brassica nigra, Brassica rapa, Brassica tournefortii, Brickellia eupatorioides* var. *eupatorioides, Bromus arvensis, Bromus carinatus, Bromus catharticus, Bromus diandrus, Bromus diandrus* ssp. *rigidus, Bromus hordeaceus, Bromus hordeaceus* ssp. *hordeaceus, Bromus inermis, Bromus japonicus, Bromus racemosus, Bromus rubens, Bromus secalinus, Bromus sterilis, Bromus tectorum, Broussonetia papyrifera, Bruguiera sexangula, Brunnichia ovata, Bryonia alba, Bryum argenteum, Buddleja davidii, Buglossoides arvensis, Bupleurum rotundifolium, Butomus umbellatus, Cabomba caroliniana, Caesalpinia decapetala, Calandrinia caulescens, Calandrinia ciliata, Callirhoe involucrata, Callitriche stagnalis, Calophyllum antillanum, Calystegia sepium, Calystegia sepium* ssp. *sepium, Camelina microcarpa, Campanula rapunculoides, Campsis radicans, Cannabis sativa, Caperonia palustris, Capsella bursa-pastoris, Cardamine hirsuta, Cardamine impatiens, Cardamine parviflora, Cardaria chalepensis, Cardaria draba, Cardaria pubescens, Cardiospermum halicacabum, Carduus, Carduus acanthoides, Carduus crispus, Carduus nutans, Carduus pycnocephalus, Carduus tenuiflorus, Carex kobomugi, Carpobrotus edulis, Carthamus lanatus, Carthamus lanatus* ssp. *creticus, Carthamus leucocaulos, Carthamus oxyacanthus, Carum carvi, Castilla elastica, Casuarina, Casuarina equisetifolia, Casuarina glauca, Caulerpa taxifolia, Cecropia obtusifolia, Celastrus orbiculatus, Cenchrus echinatus, Cenchrus longispinus, Cenchrus spinifex, Centaurea calcitrapa, Centaurea cyanus, Centaurea diffusa, Centaurea iberica, Centaurea jacea, Centaurea macrocephala, Centaurea melitensis, Centaurea nigra, Centaurea nigrescens, Centaurea solstitialis, Centaurea stoebe* ssp. *micranthos, Centaurea sulphurea, Centaurea virgata, Centaurea virgata* ssp. *squarrosa, Centromadia pungens* ssp. *pungens, Cerastium fontanum, Cerastium fontanum* ssp. *vulgare, Cerastium vulgatum, Ceratocephala testiculata, Cereus hildmannianus, Cestrum diurnum, Cestrum nocturnum, Chaenorhinum minus, Chamaecrista fasciculata* var. *fasciculata, Chamaesyce glyptosperma, Chamaesyce humistrata, Chamaesyce hyssopifolia, Chamaesyce maculata, Chamaesyce nutans, Chamerion angustifolium* ssp. *angustifolium, Chenopodium album, Chenopodium berlandieri, Chenopodium leptophyllum, Chenopodium murale, Chenopodium simplex, Chloris verticillata, Chloris virgata, Chondrilla juncea, Chorispora tenella, Chromolaena odorata, Chrysophyllum cainito, Chrysophyllum mexicanum, Chrysophyllum oliviforme, Chrysopogon aciculatus, Chrysothamnus viscidiflorus, Cichorium intybus, Cicuta douglasii, Cicuta maculata, Cinchona pubescens, Cinnamomum burmannii, Cinnamomum camphora, Cirsium, Cirsium altissimum, Cirsium arvense, Cirsium canescens, Cirsium discolor, Cirsium flodmanii, Cirsium foliosum, Cirsium horridulum, Cirsium japonicum, Cirsium ochrocentrum, Cirsium undulatum, Cir-* sium vulgare, Citharexylum caudatum, Citharexylum spinosum, Citrullus lanatus var. lanatus, Citrus reticulata ssp. unshiu, Claytonia perfoliata ssp. perfoliata, Clematis orientalis, Clematis terniflora, Clematis virginiana, Clematis vitalba, Cleome gynandra, Cleome serrulata, Clerodendrum bungei, Clerodendrum chinense, Clerodendrum macrostegium, Clidemia hirta, Clidemia hirta var. hirta, Clusia rosea, Cnicus benedictus, Coccinia grandis, Cocculus carolinus, Colocasia esculenta, Colubrina asiatica, Commelina benghalensis, Commelina communis, Commelina diffusa, Conicosia pugioniformis, Conium maculatum, Conoclinium coelestinum, Convallaria majalis, Convolvulus arvensis, Conyza bonariensis, Conyza canadensis, Coreopsis tinctoria, Coronopus didymus, Coronopus squamatus, Cortaderia jubata, Cortaderia selloana, Corynocarpus laevigatus, Cosmos bipinnatus, Cosmos sulphureus, Cotoneaster lacteus, Cotoneaster pannosus, Cotula australis, Crassula helmsii, Crataegus monogyna, Crepis setosa, Crotalaria, Crotalaria spectabilis, Croton capitatus, Croton glandulosus, Croton setigerus, Croton texensis, Crupina vulgaris, Cryptostegia madagascariensis, Cucumis anguria, Cucumis melo, Cucumis myriocarpus, Cucurbita foetidissima, Cupaniopsis anacardioides, Cuscuta, Cuscuta approximata, Cuscuta boldinghii, Cuscuta cassytoides, Cuscuta epilinum, Cuscuta epithymum, Cuscuta europaea, Cuscuta indecora, Cuscuta indecora var. bifida, Cuscuta indecora var. indecora, Cuscuta indecora var. longisepala, Cuscuta indecora var. neuropetala, Cuscuta japonica, Cuscuta pentagona, Cuscuta pentagona var. glabrior, Cuscuta pentagona var. pentagona, Cuscuta pentagona var. pubescens, Cuscuta reflexa, Cuscuta suaveolens, Cuscuta umbellata, Cyathea cooperi, Cyclachaena xanthiifolia, Cymbopogon refractus, Cynanchum laeve, Cynanchum louiseae, Cynanchum rossicum, Cynanchum vincetoxicum, Cynara cardunculus, Cynodon, Cynodon dactylon, Cynoglossum officinale, Cyperus acuminatus, Cyperus compressus, Cyperus difformis, Cyperus erythrorhizos, Cyperus esculentus, Cyperus haspan, Cyperus involucratus, Cyperus iria, Cyperus odoratus, Cyperus prolifer, Cyperus rotundus, Cyperus strigosus, Cytisus scoparius, Cytisus scoparius var. andreanus, Cytisus scoparius var. scoparius, Cytisus striatus, Dactylis glomerata, Dactyloctenium aegyptium, Daphne laureola, Datura inoxia, Datura quercifolia, Datura stramonium, Daucus carota, Delairea odorata, Delphinium carolinianum ssp. virescens, Delphinium geyeri, Delphinium nuttallianum, Delphinium× occidentale, Deparia petersenii, Descurainia pinnata, Descurainia sophia, Desmanthus illinoensis, Desmodium cajanifolium, Desmodium tortuosum, Dianthus armeria, Dichrostachys cinerea, Digitalis purpurea, Digitaria abyssinica, Digitaria adscendens, Digitaria bicornis, Digitaria ciliaris, Digitaria ischaemum, Digitaria sanguinalis, Digitaria velutina, Diodia teres, Diodia virginiana, Dioscorea alata, Dioscorea bulbifera, Dioscorea oppositifolia, Dipsacus fullonum, Dipsacus laciniatus, Dipsacus sativus, Dissotis rotundifolia, Distichlis spicata, Draba verna, Dracopis amplexicaulis, Drymaria arenarioides, Dysphania ambrosioides, Dyssodia papposa, Echinochloa colona, Echinochloa crus-galli, Echinocystis lobata, Echinodorus cordifolius, Echium plantagineum, Echium vulgare, Eclipta alba, Eclipta prostrata, Egeria densa, Ehrharta calycina, Ehrharta erecta, Eichhornia, Eichhornia azurea, Eichhornia crassipes, Elaeagnus angustifolia, Elaeagnus pungens, Elaeagnus umbellata, Elephantopus mollis, Eleusine indica, Ellisia nyctelea, Elodea canadensis, Elsholtzia ciliata, Elymus repens, Emilia sonchifolia, Emex australis, Emex spinosa, Enterolobium contortisiliquum, Epilobium hirsutum, Epilobium paniculatum, Epipremnum pinnatum, Equisetum arvense, Equisetum hyemale, Equisetum laevigatum, Equisetum telmateia, Eragrostis cilianensis, Eragrostis pilosa, Eragrostis spectabilis, Erechtites glomeratus, Erechtites minimus, Ericameria nauseosa ssp. nauseosa var. nauseosa, Erigeron annuus, Erigeron bonariensis, Erigeron canadensis, Erigeron karvinskianus, Erigeron philadelphicus, Erigeron strigosus, Eriobotrya japonica, Eriochloa acuminata var. acuminata, Eriochloa contracta, Eriochloa villosa, Eriogonum annuum, Erodium cicutarium, Erysimum cheiranthoides, Erysimum repandum, Eschscholzia californica, Eucalyptus globulus, Eucalyptus robusta, Eugenia uniflora, Euonymus alatus, Euonymus fortunei, Eupatorium altissimum, Eupatorium capillifolium, Euphorbia cyathophora, Euphorbia cyparissias, Euphorbia dentata, Euphorbia esula, Euphorbia esula var. esula, Euphorbia heterophylla, Euphorbia humifusa, Euphorbia marginata, Euphorbia myrsinites, Euphorbia oblongata, Euphorbia serrata, Euphorbia terracina, Euryops multifidus, Eutrochium fistulosum, Fagopyrum tataricum, Falcataria moluccana, Fatoua villosa, Ficus altissima, Ficus carica, Ficus microcarpa, Ficus rubiginosa, Fimbristylis quinquangularis, Flacourtia indica, Flaveria trinervia, Flueggea acidoton, Foeniculum vulgare, Fragaria virginiana, Frangula alnus, Fraxinus americana, Fraxinus pennsylvanica, Fraxinus uhdei, Froelichia floridana, Froelichia gracilis, Furcraea foetida, Galega officinalis, Galeopsis tetrahit, Galinsoga parviflora, Galinsoga quadriradiata, Galium aparine, Gamochaeta purpurea, Genista monspessulana, Geranium carolinianum, Geranium dissectum, Geranium robertianum, Glaucium corniculatum, Glechoma hederacea, Gleditsia triacanthos, Glossostigma cleistanthum, Glossostigma diandrum, Glyceria maxima, Glycine max, Glycyrrhiza lepidota, Gnaphalium palustre, Gnaphalium purpureum, Gossypium hirsutum, Grevillea banksii, Grevillea robusta, Grindelia papposa, Grindelia squarrosa, Gutierrezia sarothrae, Gypsophila paniculata, Haematoxylum campechianum, Halimodendron halodendron, Halogeton glomeratus, Harrisia martinii, Hedeoma hispida, Hedera helix, Hedera hibernica, Hedychium coronarium, Hedychium flavescens, Hedychium gardnerianum, Helenium amarum, Helenium autumnale, Helianthus annuus, Helianthus ciliaris, Helianthus grosseserratus, Helianthus nuttallii, Helianthus petiolaris, Helianthus tuberosus, Helichrysum petiolare, Heliocarpus popayanensis, Heliopsis helianthoides, Hemerocallis fulva, Heracleum mantegazzianum, Heracleum maximum, Hesperis matronalis, Heteranthera limosa, Heteranthera reniformis, Heterocentron subtriplinervium, Heteropogon contortus, Heterotheca subaxillaris, Hibiscus syriacus, Hibiscus tiliaceus, Hibiscus trionum, Hieracium, Hieracium atratum, Hieracium aurantiacum, Hieracium caespitosum, Hieracium canadense, Hieracium×floribundum, Hieracium laevigatum, Hieracium pilosella, Hieracium piloselloides, Hiptage benghalensis, Hoffmannseggia glauca, Holcus lanatus, Hordeum jubatum, Hordeum murinum ssp. leporinum, Hordeum pusillum, Hordeum vulgare, Humulus japonicus, Hydrilla verticillata, Hydrocharis morsus-ranae, Hygrophila polysperma, Hymenachne amplexicaulis, Hyoscyamus niger, Hyparrhenia rufa, Hypericum canariense, Hypericum perforatum, Hypochaeris radicata, Hyptis pectinata, Hyptis suaveolens, Ilex aquifolium, Impatiens glandulifera, Impatiens walleriana, Imperata brasiliensis, Imperata brevifolia, Imperata cylindrica, Ipomoea, Ipomoea alba, Ipomoea aquatica, Ipomoea carnea ssp. fistulosa, Ipomoea coccinea, Ipomoea cordatotriloba var. cordatotriloba, Ipomoea hederacea, Ipomoea lacunosa, Ipomoea pandurata, Ipomoea purpurea, Ipomoea quamoclit, Ipomoea triloba, Ipomoea turbinata, Ipomoea wrightii, Iris douglasiana, *Iris missouriensis, Iris pseudacorus, Isatis tinctoria, Ischaemum rugosum, Iva annua, Iva axillaris, Jacquemontia tamnifolia, Jasminum dichotomum, Jasminum fluminense, Jasminum sambac, Juncus bufonius, Juncus effusus, Juncus planifolius, Juncus polyanthemos, Juncus tenuis, Juniperus virginiana, Kalanchoe pinnata, Kickxia elatine, Kochia scoparia, Koelreuteria elegans, Kummerowia stipulacea, Kummerowia striata, Lactuca floridana, Lactuca serriola, Lactuca tatarica* var. *pulchella, Lagarosiphon, Lagarosiphon major, Lagascea mollis, Lamium amplexicaule, Lamium purpureum, Lamium purpureum* var. *incisum, Landoltia punctata, Lantana camara, Lappula occidentalis, Lapsana communis, Larrea tridentata, Lathyrus latifolius, Leonurus cardiaca, Lepidium austrinum, Lepidium campestre, Lepidium densiflorum, Lepidium latifolium, Lepidium perfoliatum, Lepidium virginicum, Leptochloa chinensis, Leptochloa fusca* ssp. *fascicularis, Leptochloa fusca* ssp. *uninervia, Leptochloa panicoides, Leptospermum scoparium, Lepyrodiclis holosteoides, Lespedeza bicolor, Lespedeza cuneata, Leucaena leucocephala, Leucanthemum vulgare, Ligustrum lucidum, Ligustrum obtusifolium, Ligustrum ovalifolium, Ligustrum sinense, Ligustrum vulgare, Limnobium spongia, Limnocharis flava, Limnophila indica, Limnophila sessiliflora, Linaria dalmatica, Linaria dalmatica* ssp. *dalmatica, Linaria genistifolia, Linaria vulgaris, Livistona chinensis, Lolium perenne, Lolium multiflorum, Lolium temulentum, Lonicera×bella, Lonicera fragrantissima, Lonicera japonica, Lonicera maackii, Lonicera morrowii, Lonicera tatarica, Lonicera xylosteum, Lophostemon confertus, Lotus corniculatus, Ludwigia decurrens, Ludwigia grandiflora* ssp. *grandiflora, Ludwigia grandiflora* ssp. *hexapetala, Ludwigia peploides, Lunularia cruciata, Lupinus arboreus, Lupinus perennis, Lupinus plattensis, Lupinus pusillus, Lupinus wyethii, Lychnis flos-cuculi, Lycium barbarum, Lycium ferocissimum, Lycopus americanus, Lygodesmia juncea, Lygodium japonicum, Lygodium microphyllum, Lysimachia nummularia, Lysimachia vulgaris, Lythrum, Lythrum salicaria, Lythrum virgatum, Macaranga mappa, Macaranga tanarius, Macfadyena unguis-cati, Machaeranthera canescens, Machaeranthera pinnatifida* ssp. *pinnatifida* var. *pinnatifida, Macleaya cordata, Madia sativa, Mahonia, Malachra alceifolia, Malva neglecta, Malva parviflora, Malvella leprosa, Marah oreganus, Marchantia polymorpha* ssp. *polymorpha, Marrubium vulgare, Marsilea quadrifolia, Matricaria discoidea, Matricaria maritime, Medicago lupulina, Medicago polymorpha, Medicago sativa, Medinilla cummingii, Medinilla magnifica, Medinilla venosa, Melaleuca quinquenervia, Melastoma, Melastoma candidum, Melastoma malabathricum, Melastoma sanguineum, Melia azedarach, Melilotus officinalis, Melinis minutiflora, Melinis repens, Melochia corchorifolia, Melochia umbellata, Mentha arvensis, Mentha×piperita, Mentha pulegium, Mentha spicata, Mentzelia decapetala, Merremia tuberosa, Mesembryanthemum crystallinum, Miconia, Miconia calvescens, Microlaena stipoides, Microstegium vimineum, Mikania cordata, Mikania micrantha, Mikania scandens, Milium vernale, Mimosa diplotricha, Mimosa pellita, Mirabilis nyctaginea, Miscanthus floridulus, Miscanthus sinensis, Misopates orontium, Mollugo verticillata, Monarda fistulosa, Monarda pectinata, Monochoria hastata, Monochoria vaginalis, Monolepis nuttalliana, Montanoa hibiscifolia, Moraea, Moraea collina, Moraea flaccida, Moraea miniata, Moraea ochroleuca, Moraea pallida, Morella cerifera, Morella faya, Morus alba, Mosla dianthera, Muhlenbergia frondosa, Muhlenbergia racemosa, Muhlenbergia schreberi, Murdannia keisak, Murdannia nudiflora, Murraya exotica, Muscari botryoides, Muscari comosum, Muscari neglectum, Myoporum laetum, Myosotis scorpioides, Myriophyllum aquaticum, Myriophyllum heterophyllum, Myriophyllum spicatum, Najas minor, Nandina domestica, Nardus stricta, Nassella trichotoma, Nasturtium microphyllum, Nasturtium officinale, Nechamandra alternifolia, Nekemias arborea, Nelumbo lutea, Neonotonia wightii* var. *wightii, Nepeta cataria, Nephrolepis cordifolia, Nephrolepis multiflora, Neyraudia reynaudiana, Nicandra physalodes, Nicotiana glauca, Nuttallanthus canadensis, Nymphaea mexicana, Nymphaea odorata, Nymphoides peltata, Ochrosia elliptica, Oeceoclades maculata, Oenothera biennis, Oenothera curtiflora, Oenothera laciniata, Oenothera sinuosa, Oenothera suffrutescens, Oenothera xerogaura, Olea europaea, Ononis alopecuroides, Onopordum, Onopordum acanthium, Onopordum acaulon, Onopordum illyricum, Onopordum tauricum, Opuntia aurantiaca, Opuntia fragilis, Opuntia polyacantha, Ornithogalum umbellatum, Orobanche, Orobanche cooperi, Orobanche minor, Orobanche ramosa, Oryza longistaminata, Oryza punctata, Oryza rufipogon, Oryza sativa, Ottelia alismoides, Oxalis corniculata, Oxalis stricta, Oxyspora paniculata, Oxytropis lambertii, Oxytropis sericea, Packera glabella, Paederia cruddasiana, Paederia foetida, Panicum antidotale, Panicum capillare, Panicum dichotomiflorum, Panicum maximum, Panicum miliaceum, Panicum repens, Panicum virgatum, Papaver dubium, Papaver somniferum, Paraderris elliptica, Paraserianthes lophantha* ssp. *montana, Parietaria pensylvanica, Parthenium hysterophorus, Parthenocissus quinquefolia, Paspalum conjugatum, Paspalum denticulatum, Paspalum dilatatum, Paspalum laeve, Paspalum notatum, Paspalum scrobiculatum, Paspalum urvillei, Passiflora bicornis, Passiflora biflora, Passiflora edulis, Passiflora foetida, Passiflora incarnata, Passiflora laurifolia, Passiflora ligularis, Passiflora lutea, Passiflora suberosa, Passiflora tarminiana, Passiflora tripartita* var. *mollissima, Pastinaca sativa, Paulownia tomentosa, Peganum harmala, Pennisetum ciliare, Pennisetum clandestinum, Pennisetum glaucum, Pennisetum macrourum, Pennisetum pedicellatum, Pennisetum polystachion, Pennisetum purpureum, Pennisetum setaceum, Perilla frutescens, Phalaris aquatica, Phalaris arundinacea, Phalaris canariensis, Phalaris minor, Phleum pratense, Phoenix reclinata, Phormium tenax, Phragmites australis, Phyllanthus tenellus, Phyllanthus urinaria, Phyllostachys aurea, Phyllostachys nigra, Physalis acutifolia, Physalis angulata, Physalis heterophylla, Physalis longifolia, Physalis longifolia* var. *subglabrata, Physalis virginiana, Physalis viscosa, Phytolacca americana, Picris hieracioides, Pimenta dioica, Pimenta racemosa, Pinus elliottii* var. *elliottii, Pinus patula, Pinus pinaster, Pinus radiata, Pinus taeda, Piper aduncum, Pistia stratiotes, Pittosporum undulatum, Plantago aristata, Plantago lanceolata, Plantago major, Plantago patagonica, Plantago rugelii, Plantago virginica, Pluchea carolinensis, Pluchea indica, Poa annua, Poa bulbosa, Poa compressa, Poa pratensis, Poa trivialis, Polygonatum biflorum, Polygonum achoreum, Polygonum amphibium, Polygonum arenastrum, Polygonum aviculare, Polygonum cespitosum, Polygonum convolvulus, Polygonum cuspidatum, Polygonum erectum, Polygonum lapathifolium, Polygonum orientale, Polygonum pensylvanicum, Polygonum perfoliatum, Polygonum persicaria, Polygonum polystachyum, Polygonum ramosissimum, Polygonum sachalinense, Polypogon monspeliensis, Pontederia cordata, Pontederia rotundifolia, Populus alba, Populus deltoides, Portulaca oleracea, Potamogeton crispus, Potentilla recta, Potentilla simplex, Proboscidea louisianica, Prosopis, Prosopis alpataco, Prosopis argentina, Prosopis burkartii, Prosopis caldenia, Prosopis* calingastana, *Prosopis campestris, Prosopis castellanosii, Prosopis denudans, Prosopis elata, Prosopis farcta, Prosopis ferox, Prosopis fiebrigii, Prosopis glandulosa, Prosopis hassleri, Prosopis humilis, Prosopis juliflora, Prosopis kuntzei, Prosopis pallida, Prosopis palmeri, Prosopis reptans, Prosopis rojasiana, Prosopis ruizlealii, Prosopis ruscifolia, Prosopis sericantha, Prosopis strombulifera, Prosopis torquata, Prosopis velutina, Prunella vulgaris, Prunus serotina, Prunus virginiana, Psidium cattleianum, Psidium guajava, Pteridium aquilinum, Pteridium aquilinum* var. *pubescens, Pteris vittata, Ptychosperma elegans, Pueraria montana, Pueraria montana* var. *lobata, Pueraria phaseoloides, Pyrrhopappus carolinianus, Ranunculus abortivus, Ranunculus acris, Ranunculus arvensis, Ranunculus bulbosus, Ranunculus ficaria, Ranunculus repens, Ranunculus sardous, Raphanus raphanistrum, Raphanus sativus, Retama monosperma, Rhamnus, Rhamnus cathartica, Rhizophora mangle, Rhodomyrtus tomentosa, Rhus glabra, Rhus typhina, Rhynchospora caduca, Rhynchospora corniculata, Ribes, Richardia scabra, Ricinus communis, Robinia pseudoacacia, Rorippa austriaca, Rorippa palustris, Rorippa sinuata, Rorippa sylvestris, Rosa arkansana, Rosa multiflora, Rosa rugosa, Rottboellia cochinchinensis, Rubus argutus, Rubus armeniacus, Rubus ellipticus* var. *obcordatus, Rubus fruticosus, Rubus glaucus, Rubus laciniatus, Rubus moluccanus, Rubus niveus, Rubus phoenicolasius, Rubus rosifolius, Rubus sieboldii, Rudbeckia hirta, Ruellia caerulea, Rumex, Rumex acetosella, Rumex altissimus, Rumex crispus, Rumex obtusifolius, Saccharum spontaneum, Sacciolepis indica, Sagina procumbens, Sagittaria graminea, Sagittaria latifolia, Sagittaria montevidensis, Sagittaria sagittifolia, Salsola, Salsola collina, Salsola kali, Salsola paulsenii, Salsola tragus, Salsola vermiculata, Salvia aethiopis, Salvia lyrata, Salvia pratensis, Salvia reflexa, Salvia sclarea, Salvia×superba, Salvinia, Salvinia auriculata, Salvinia biloba, Salvinia herzogii, Salvinia molesta, Sansevieria hyacinthoides, Saponaria officinalis, Sarcobatus vermiculatus, Saururus cernuus, Scaevola sericea, Schedonnardus paniculatus, Schedonorus arundinaceus, Schedonorus pratensis, Schefflera actinophylla, Schinus molle, Schinus terebinthifolius, Schismus arabicus, Schismus barbatus, Schizachyrium condensatum, Schoenoplectiella mucronata, Schoenoplectus acutus* var. *acutus, Scleranthus annuus, Sclerochloa dura, Scolymus, Scolymus hispanicus, Scoparia dulcis, Secale cereal, Securigera varia, Senecio jacobaea, Senecio madagascariensis, Senecio riddellii, Senecio squalidus, Senecio vulgaris, Senna obtusifolia, Senna occidentalis, Senna pendula* var. *glabrata, Sesbania exaltata, Sesbania herbacea, Sesbania punicea, Setaria faberi, Setaria italica, Setaria palmifolia, Setaria parviflora, Setaria pumila, Setaria pumila* ssp. *pallidefusca, Setaria pumila* ssp. *pumila, Setaria verticillata, Setaria viridis, Sibara virginica, Sicyos angulatus, Sida rhombifolia, Sida spinosa, Silene conoidea, Silene latifolia* ssp. *alba, Silene noctiflora, Silene vulgaris, Silphium perfoliatum, Silybum, Silybum marianum, Sinapis, Sinapis arvensis* ssp. *arvensis, Sisymbrium altissimum, Sisymbrium irio, Sisymbrium loeselii, Sisymbrium officinale, Smilax rotundifolia, Solanum americanum, Solanum cardiophyllum, Solanum carolinense, Solanum dimidiatum, Solanum diphyllum, Solanum dulcamara, Solanum elaeagnifolium, Solanum jamaicense, Solanum lanceolatum, Solanum marginatum, Solanum nigrum, Solanum physalifolium, Solanum ptycanthum, Solanum robustum, Solanum rostratum, Solanum tampicense, Solanum torvum, Solanum triflorum, Solanum viarum, Solidago altissima, Solidago canadensis, Solidago missouriensis, Soliva sessilis, Soliva pterosperma, Sonchus arvensis, Sonchus arvensis* ssp. *arvensis, Sonchus arvensis* ssp. *uliginosus, Sonchus asper, Sonchus oleraceus, Sorghastrum nutans, Sorghum almum, Sorghum bicolor, Sorghum halepense, Sorghum propinquum, Sparganium erectum, Spartina alterniflora, Spartina anglica, Spartina densiflora, Spartina patens, Spartium junceum, Spathodea campanulata, Spergula arvensis, Spermacoce alata, Sphaeralcea coccinea, Sphaerophysa salsula, Sphagneticola trilobata, Sphenoclea zeylanica, Spiraea japonica, Sporobolus cryptandrus, Sporobolus indicus, Sporobolus vaginiflorus, Stachys floridana, Stellaria graminea, Stellaria media, Stratiotes aloides, Striga, Striga asiatica, Symphoricarpos occidentalis, Symphyotrichum divaricatum, Symphyotrichum ericoides* var. *ericoides, Symphyotrichum pilosum* var. *pilosum, Symphytum asperum, Syngonium podophyllum, Syzygium cumini, Syzygium jambos, Taeniatherum caput-medusae, Tagetes minuta, Tamarix, Tamarix aralensis, Tamarix chinensis, Tamarix gallica, Tamarix parviflora, Tamarix ramosissima, Tanacetum vulgare, Taraxacum officinale, Tectaria incisa, Terminalia catappa, Tetradymia canescens, Tetragonia tetragonioides, Tetrastigma voinieranum, Tetrazygia bicolor, Teucrium canadense, Themeda villosa, Thermopsis rhombifolia, Thespesia populnea, Thlaspi arvense, Thymelaea passerina, Thymus praecox* ssp. *arcticus, Tibouchina, Tibouchina herbacea, Tibouchina longifolia, Tibouchina urvilleana, Toona ciliata, Torilis arvensis, Toxicodendron pubescens, Toxicodendron radicans, Toxicodendron radicans* ssp. *radicans, Toxicodendron rydbergii, Toxicodendron vernix, Tradescantia fluminensis, Tradescantia spathacea, Tragopogon dubius, Trapa, Trapa natans, Trema orientalis, Triadica sebifera, Trianthema portulacastrum, Tribulus cistoides, Tribulus terrestris, Tridax procumbens, Trifolium arvense, Trifolium campestre, Trifolium incarnatum, Trifolium repens, Triglochin maritima, Triodanis perfoliata, Triphasia trifolia, Tripleurospermum perforatum, Tripsacum dactyloides, Triticum aestivum, Triumfetta rhomboidea, Triumfetta semitriloba, Tussilago farfara, Typha latifolia, Ulex europaeus, Ulmus parvifolia, Ulmus pumila, Urena lobata, Urochloa fusca, Urochloa maxima, Urochloa mutica, Urochloa panicoides, Urochloa platyphylla, Urochloa ramosa, Urochloa texana, Urtica dioica, Urtica dioica* ssp. *gracilis, Utricularia inflata, Vaccaria hispanica, Vachellia farnesiana, Valeriana officinalis, Valerianella radiata, Ventenata dubia, Veratrum californicum, Verbascum blattaria, Verbascum thapsus, Verbena bracteata, Verbena hastata, Verbena stricta, Verbena urticifolia, Verbesina encelioides, Vernicia fordii, Vernonia baldwinii, Vernonia gigantea, Veronica agrestis, Veronica arvensis, Veronica biloba, Veronica filiformis, Veronica peregrina, Veronica persica, Viburnum lantana, Viburnum opulus, Vicia benghalensis, Vicia sativa* ssp. *nigra, Vicia tetrasperma, Vicia villosa, Vigna unguiculata, Vinca major, Vinca minor, Viola arvensis, Viola nephrophylla, Viola sororia, Viscum album, Vitis, Vitis aestivalis, Vitis labrusca, Vitis riparia, Vitis vulpina, Vossia cuspidata, Vulpia myuros, Vulpia octoflora, Wisteria floribunda, Wisteria sinensis, Xanthium, Xanthium spinosum, Xanthium strumarium, Xanthium strumarium* var. *canadense, Xylorhiza glabriuscula, Yucca glauca Zea mays Zigadenus venenosus* and *Zygophyllum fabago*.

In an aspect, methods and compositions of the present invention are used to control annual grasses belonging to the genera including but not limited to *Microstegium, Digitaria, Poa, Bromus, Ventenata, Taeniatherum, Secale,* and *Aegilops*.

In another aspect, methods and compositions of the present invention are used to control annual grasses belong to the species including but not limited to *Microstegium vimineum*

(Japanese stiltgrass), *Digitaria abyssinica* (East African couchgrass), *Digitaria bicornis* (Asian crabgrass), *Digitaria ciliaris* (southern crabgrass), *Digitaria ischaemum* (smooth crabgrass or small crabgrass), *Digitaria sanguinalis* (hairy crabgrass), *Digitaria velutina* (velvet crabgrass), *Poa bulbosa* (bulbous bluegrass), *Bromus tectorum* (cheatgrass or downy brome), *Bromus rubens* (red brome), *Bromus secalinus* (cheat) and *Bromus japonicus* (Japanese brome), *Ventenata dubia* (ventenata), *Taeniatherum caput-medusae* (medusahead), *Secale* cereal (feral rye), *Aegilops triuncialis* (barb goatgrass), and *Aegilops cylindrica* (jointed goatgrass).

In another aspect, compositions described herein are applied in rangeland, pastures, natural areas, or other non-crop areas according to the method of the present invention.

In another aspect, animals graze and/or are intended to graze in the rangeland, pastures, natural areas, or other non-crop areas to which compositions described herein are applied.

The animal grazing in the area in which a composition is applied according to the method of the present invention may be any animal. In an aspect, the grazing animal is an animal whose milk or meat is to be consumed by humans or by animals (e.g., pets including cats and dogs).

In an aspect, the animal is a mammal or a bird.

In certain embodiments, the animal is a bird. For example, in certain embodiments, the animal is a chicken, turkey, pheasant, grouse, duck, goose, quail, partridge, or dove.

In certain embodiments, the animal is a ruminant animal. For example, in certain embodiments, the animal is a cow, goat, sheep, bison, horse, elk, moose, antelope or deer.

In certain embodiments, the animal is a ruminant animal other than a goat.

In certain embodiments, the animal is a cow.

In an aspect, animals which graze in rangeland, pastures, natural areas, or other non-crop areas to which compositions described herein do not accumulate the active agronomic ingredient(s) in the animal's milk or tissues.

In an aspect, plants (e.g., grass) treated according to the method of the present invention is safe for consumption by grazing animals immediately following treatment.

In an aspect, grazing animals may consume plants (e.g., grass) treated according to the method of the present invention any time period after treatment. For example, grazing animals may advantageously consume the treated plants immediately following treatment.

In an aspect, milk produced by animals which consume plants (e.g., grass) treated according to the method of the present invention is safe for human consumption. In an aspect, said milk is of food-grade quality.

In an aspect, milk produced by animals which consume plants (e.g., grass) treated according to the method of the present invention is safe for animal consumption. In an aspect, said milk is of pet food-grade quality.

In an aspect, tissues (i.e., meat and organs) of animals which consume plants (e.g., grass) treated according to the method of the present invention are safe for human consumption. In an aspect, said tissues are of food-grade quality.

In an aspect, tissues (i.e., meat and organs) of animals which consume plants (e.g., grass) treated according to the method of the present invention are safe for animal consumption. In an aspect, said tissues are of pet food-grade quality.

In an aspect, the amount of residual cellulose biosynthesis inhibitor present in the animals' fat after the animals graze on the treated grass is less than 0.350 ppm, or less than 0.300 ppm, or less than 0.250 ppm, or less than 0.200 ppm, or less than 0.150 ppm.

In another aspect, where the animal is a cow, the amount of residual cellulose biosynthesis inhibitor present in the cow's fat after the cow grazes on the treated grass is less than 0.250 ppm, or less than 0.200 ppm, or less than 0.150 ppm, or less than 0.120 ppm, or less than 0.090 ppm.

In an aspect, the amount of residual cellulose biosynthesis inhibitor present in the animals' meat e.g., muscle) after the animals graze on the treated grass is less than 0.250 ppm, or less than 0.200 ppm, or less than 0.150 ppm, or less than 0.075 ppm, or less than 0.050 ppm.

In another aspect, where the animal is a cow, the amount of residual cellulose biosynthesis inhibitor present in the cow's meat (e.g., muscle) after the cow grazes on the treated grass is less than 0.200 ppm, or less than 0.150 ppm, or less than 0.075 ppm, or less than 0.050 ppm, or less than 0.020 ppm.

In an aspect, the amount of residual cellulose biosynthesis inhibitor present after the animals graze on the treated grass in meat byproducts from the animal is less than X, or less than Y, or less than Z, or less than A, or less than B.

In another aspect, where the animal is a cow, the amount of residual cellulose biosynthesis inhibitor present after the cow grazes on the treated grass in meat byproducts from the cow is less than 2.00 ppm, or less than 1.50 ppm, or less than 1.00 ppm, or less than 0.75 ppm, or less than 0.30 ppm.

In an aspect, meat byproducts include but are not limited to a grazing animal's liver, kidneys, lungs, spleen, brain, blood, bone, partially defatted low temperature fatty tissue, stomachs, intestines freed of their contents, and other non-rendered animal organs and parts. In an aspect, meat byproducts from grazing animals which consume plants treated according to the present method are safe for human consumption and for use in pet foods.

In an aspect, the amount of residual cellulose biosynthesis inhibitor present in the animals' milk after the animals graze on the treated grass is less than 0.250 ppm, or less than 0.200 ppm, or less than 0.150 ppm, or less than 0.100 ppm, or less than 0.075 ppm.

In another aspect, where the animal is a cow, the amount of residual cellulose biosynthesis inhibitor present in the cow's milk after the cow grazes on the treated grass is less than 0.200 ppm, or less than 0.150 ppm, or less than 0.100 ppm, or less than 0.075 ppm, or less than 0.030 ppm.

As used herein, "rangeland" denotes any field or grassland area, especially areas used for grazing domestic livestock, protection of fauna and flora, restoration of fauna and flora or for recreation. Rangelands include, for example, tallgrass prairies, shortgrass prairies, desert grasslands, shrublands, woodlands, forests, savannas, chaparrals, and steppes. Rangelands are also called pampas.

As used herein, "pasture" denotes, for example, any field or grassland area, similar to rangeland, except that, generally, rangeland tends to have natural vegetation along with a few optionally introduced plant species managed by grazing, whereas pastures have forage that is adapted for livestock and managed by seeding, mowing, fertilization and irrigation.

As used herein, "natural area" denotes, for example, conservation lands set aside for preservation or restoration and used for recreation, ecosystem services, or other non-agricultural purposes, such as parks (e.g., city, county, state or national parks) and private woods.

As used herein, "rangeland", "pastures" and "natural areas" are distinct sites.

As used herein, "other non-crop area" means any area other than a rangeland, pasture, or natural area and which has not been cultivated by humans to grow crops.

Suitable compositions applied according to the present invention can be formulated in any desired manner and include any desired excipients which, for example, do not adversely affect the health of the grazing animals.

Compositions used according to the present invention can be commercial formulations which contains various formulation additives. The compositions can be formulated as a granular formulation, seed treatment, foliar composition, a foliar spray, solutions, tank-mix products, emulsions, suspension, coating formulation, encapsulated formulation, solid, liquid, fertilizer, paste, powder, suspension, or suspension concentrate. The composition may be employed alone or in solid, dispersant, or liquid formulation.

These formulations are produced in any desired or known manner, for example by mixing the active compounds with extenders, such as liquid solvents, pressurized liquefied gases and/or solid carriers, optionally with the use of surface-active agents, such as emulsifiers and/or dispersants and/or foam formers. If the extender used is water, it is also useful to employ for example organic solvents as cosolvents.

Suitable liquid solvents include: aromatics, such as xylene, toluene or alkylnaphthalenes, chlorinated aromatics or chlorinated aliphatic hydrocarbons, such as chlorobenzenes, chloroethylenes or methylene chloride, aliphatic hydrocarbons, such as cyclohexane or paraffins, for example mineral oil fractions, alcohols, such as butanol or glycol as well as their ethers and esters, ketones, such as acetone, methyl ethyl ketone, methyl isobutyl ketone or cyclohexanone, strongly polar solvents, such as dimethylformamide and dimethyl sulphoxide, and also water.

Liquefied gaseous extenders or carriers include those liquids which are gaseous at ambient temperature and at atmospheric pressure, for example aerosol propellants such as halogenated hydrocarbons and also butane, propane, nitrogen and carbon dioxide.

As solid carriers there are suitable: for example, ground natural minerals, such as kaolins, clays, talc, chalk, quartz, attapulgite, montmorillonite or diatomaceous earth, and ground synthetic minerals, such as finely divided silica, alumina and silicates.

As solid carriers for granules there are suitable: for example, crushed and fractionated natural rocks such as calcite, pumice, marble, sepiolite and dolomite, and also synthetic granules of inorganic and organic meals, and granules of organic material such as sawdust, coconut shells, maize cobs and tobacco stalks.

As emulsifiers and/or foam formers there are suitable: for example, non-ionic and anionic emulsifiers, such as polyoxyethylene fatty acid esters, polyoxyethylene fatty alcohol ethers, for example alkylaryl polyglycol ethers, alkylsulphonates, alkyl sulphates, arylsulphonates and protein hydrolysates.

As dispersants, for example, lignosulphite waste liquors and methylcellulose are suitable.

Tackifiers such as carboxymethylcellulose and natural and synthetic polymers in the form of powders, granules or latices, such as gum arabic, polyvinyl alcohol and polyvinyl acetate, as well as natural phospholipids, such as cephalins and lecithins, and synthetic phospholipids, can be used in the formulations.

Other possible additives include mineral and vegetable oils.

Colorants such as inorganic pigments, for example iron oxide, titanium oxide and Prussian Blue, and organic dyestuffs, such as alizarin dyestuffs, azo dyestuffs and metal phthalocyanine dyestuffs, and trace nutrients such as salts of iron, manganese, boron, copper, cobalt, molybdenum and zinc, can also be used.

In certain embodiments, other ingredients, such as insecticides, fertilizers, biostimulants, and/or soil amendments can be used with the cellulose biosynthesis inhibitor in the methods of the invention.

A composition described herein can be applied to a soil, plant or crop, or a seed, leaf, or part thereof in a single application step. In another aspect, a composition described herein is applied to a plant or crop or a seed, leaf, or part thereof in multiple application steps, for example, two, three, four, five or more application steps. In another aspect, the second, third, fourth, or fifth or more application steps may be with the same or different compositions. The methods described herein also provide for an aspect where multiple application steps are excluded.

A composition described herein can be applied to a soil, desirable plant or crop, or a seed, or part thereof in one or more application intervals of about 30 minutes, about 1 hour, about 2 hours, about 6 hours, about 8 hours, about 12 hours, about 1 day, about 5 days, about 7 days, about 10 days, about 12 days, about 14 days, about 21 days, about 28 days, about 35 days, about 45 days, about 50 days, or about 56 days.

A composition described herein can be applied to a desirable plant or crop (e.g., grass for grazing animals), or a seed, leaf, or part thereof one or more times during a growing, planting, or harvesting season. In another aspect, a compound or composition described herein is applied to a desirable plant or crop, seed, or plant part thereof in one, two, three, four, or five or more times during a growing, planting, or harvesting season. In another aspect, a compound or composition described herein is applied to a plant, crop, seed, or plant part thereof only one time, no more than two times, or no more than three times during a growing, planting, or harvesting season. In yet another aspect, a compound or composition is applied in a single step to a seed. In yet another aspect, a seed described herein is planted in a one-pass application step.

In an aspect, a composition of the present invention is applied as a pre-plant treatment, e.g., before a desirable plant or crop is planted.

In another aspect, a composition of the present invention is applied as a post-plant treatment, e.g., after a desirable plant or crop is planted, or can be applied before and after planting.

In another aspect, the disclosure provides for pre-plant, pre-emergent, post-emergent, application steps or combinations thereof. In another aspect, a compound or composition described herein is first applied in a pre-plant step and followed by one or more pre-emergent or post-emergent steps.

Methods described herein can be used in the treatment of genetically modified organisms (GMOs), e.g., plants or seeds. Genetically modified plants (or transgenic plants) are plants of which a heterologous gene has been stably integrated into genome. The expression "heterologous gene" essentially means a gene which is provided or assembled outside the plant and when introduced in the nuclear, chloroplastic or mitochondrial genome gives the transformed plant new or improved agronomic or other properties by expressing a protein or polypeptide of interest or by down-regulating or silencing other gene(s) which are present in the plant (using for example, antisense technology, cosuppression technology or RNA interference—RNAi—technology). A heterologous gene that is located in the genome is also called a transgene. A transgene that is defined by its particular location in the plant genome is called a transformation or transgenic event.

In an aspect, plants can be obtained by traditional breeding and optimization methods or by biotechnological and recombinant methods, or combinations of these methods, including the transgenic plants and including the plant varieties which are capable or not capable of being protected by Plant Breeders' Rights.

In another aspect, plant species and plant varieties which are found in the wild or which are obtained by traditional biological breeding methods, such as hybridization or protoplast fusion, and parts of these species and varieties are treated. In a further preferred embodiment, transgenic plants and plant varieties which were obtained by recombinant methods, if appropriate in combination with traditional methods (genetically modified organisms) and their parts are treated.

"Plant parts" should be understood as meaning all above ground and subsoil parts and organs of plants, such as shoot, leaf, flower, root, leaves, needles, stalks, stems, fruiting bodies, fruits and seeds, tubers and rhizomes. Plant parts also include harvested crops, and also vegetative and generative propagation material, for example cuttings, tubers, rhizomes, slips and seeds.

Seeds, plant parts, leaves, and plants may be treated with the described compositions by applying the compounds or compositions directly to the seed, plant part, leaf, or plant. In another aspect, the seed, plant part, leaf, or plant may be treated indirectly, for example by treating the environment or habitat in which the seed, plant part, leaf, or plant is exposed to.

Conventional treatment methods may be used to treat the environment or habitat including dipping, spraying (e.g., via a backpack sprayer, a tractor-mounted boom sprayer, an ATV-mounted boom sprayer, or other sprayer), fumigating, chemigating, fogging, scattering, brushing on, shanking or injecting.

According to the invention, the treatment of plants or crops, and seeds, leaves or parts thereof with a composition described herein can be carried out directly by the customary treatment methods, for example by immersion, spraying, vaporizing, fogging, injecting, dripping, drenching, broadcasting or painting, and seed treatment.

In certain embodiments of the method of the present invention, compositions described herein are applied by ground or by air.

In an aspect, compositions described herein are applied anytime when the ground is not frozen or covered with snow.

In an aspect, compositions described herein are applied prior to seed germination of the plant pest(s) (e.g., invasive grasses) to be controlled.

Cellulose biosynthesis inhibitors such as indaziflam are activated by rainfall or irrigation of, for example, at least 0.25 inches after application to a plant pest or environment or habitat thereof.

In an aspect, compositions described herein are applied such that adequate rainfall or irrigation is received after application but prior to weed germination.

A compound or composition described herein can take any of a variety of dosage forms including, without limitation, suspension concentrates, aerosols, capsule suspensions, cold-fogging concentrates, warm-fogging concentrates, encapsulated granules, fine granules, flowable concentrates for the treatment of seed, ready-to-use solutions, dustable powders, emulsifiable concentrates, oil-in-water emulsions, water-in-oil emulsions, macrogranules, microgranules, oil-dispersible powders, oil-miscible flowable concentrates, oil-miscible liquids, foams, pastes, pesticide-coated seed, suspoemulsion concentrates, soluble concentrates, wettable powders, soluble powders, dusts and granules, water-soluble granules or tablets, water-soluble powders for the treatment of seed, wettable powders, natural products and synthetic substances impregnated with a compound or composition described herein, a net impregnated with a compound or composition described herein, and also microencapsulations in polymeric substances and in coating materials for seed, and also ULV cold-fogging and warm-fogging formulations.

A composition disclosed herein may optionally include one or more additional compounds providing an additional beneficial or otherwise useful effect. Such compounds include, without limitation, an adhesive, a surfactant, a solvent, a wetting agent, an emulsifying agent, a carrier, an adjuvant, a diluent, a dispersing agent an insecticide, a pesticide, a fungicide, a fertilizer of a micronutrient or macronutrient nature, a herbicide, a feeding inhibitor, an insect molting inhibitor, an insect mating inhibitor, an insect maturation inhibitor, a nematacide, a nutritional or horticultural supplement, or any combination thereof. In an aspect, a composition described herein is odor free.

Compositions described herein can be combined with a fertilizer. Examples of fertilizers capable of being used with the compositions and methods described herein include, for example, urea, ammonium nitrate, ammonium sulfate, calcium nitrate, diammonium phosphate, monoammonium phosphate, triple super phosphate, potassium nitrate, potassium nitrate, nitrate of potash, potassium chloride, muriate of potash, di- and mono-potassium salts of phosphite/phosphonate.

As demonstrated in the below text, it has been found by the inventors that application of compositions comprising cellulose biostynehtsis inhibitors to grass later consumed by animals does not result in any harmful accumulation of the active ingredients in the animals' milk or edible tissues.

Ruminant metabolism studies have been conducted with both [triazine-2,4-$^{14}$C] indaziflam and [indane-3-$^{14}$C] indaziflam according to current EPA guidelines. Accumulation into the edible tissues was low and the metabolism of indaziflam in ruminants is well understood.

In cattle the residues of concern for risk assessment are:
indaziflam parent compound (N-[(1R,2S)-2,6-Dimethyl-2,3-dihydro-1H-inden-1-yl]-6-[(1R)-1-fluoroethyl]-1,3,5-triazine-2,4-diamine),
indaziflam-acid ((2S,3R)-3-[[4-Amino-6-[(1R)-1-fluoroethyl]-1,3,5-triazin-2-yl]amino]-2,3-dihydro-2-methyl-1H-indene-5-carboxylic acid),
indaziflam-3 hydroxyindane ((2R,3R)-3-[[4-amino-6-[(1R)-1-fluoroethyl]-1,3,5-triazin-2-yl]amino]-2,5-dimethyl-indan-1-ol),
indaziflam-3-ketohydroxymethyl ((2R,3R)-3-[[4-amino-6-[(1R)-1-fluoroethyl]-1,3,5-triazin-2-yl]amino]-5-(hydroxymethyl)-2-methyl-indan-1-one) and
indaziflam-triazinediamine (6-[(1R)-1-Fluoroethyl]-1,3,5-triazine-2,4-diamine).

A feeding study was conducted to measure total indaziflam residue in milk, cream (milk fat), skim milk (whey), mesenteric (omental) fat, perirenal fat, subcutaneous fat, liver, kidney, muscle and excrement (feces or faeces) from lactating Holstein dairy cows (*Bos taurus*) following 29 consecutive days of dosing with indaziflam. The base daily dose of indaziflam was calculated to be 31 mg/kg dry matter feed. Four groups of cows were fed at 0 (control—two cows), 31 (1×—three cows), 934 (3×—three cows) and 311 (10×—seven cows) mg/kg dry matter feed.

Milk was collected twice daily from all dose groups, morning and evening. Doses were administered after the morning milking. Milk was subsampled for analysis from the controls and all dose groups on study days 0, 2, 4, 7, 10, 14, 17, 21, 25, and 28. A composite milk sample was collected containing the study day evening milk and the following morning milk prior to daily dose administration. On day 25, additional milk samples from both control cows and all cows from the 10× dose group were collected and pooled by group. This additional day 25 milk was processed into cream (milk fat) and skim milk for analysis.

On Day 29 (3 to approximately 7 hours after the final dose), one of the control cows, all of the 1× and 3× dose group cows, and three of the 10× dose group cows were sacrificed, and fat, liver, kidney, and muscle samples were collected from each cow for analysis.

The remaining cows (one control and four from the 10× dose level) entered the depuration phase of the study. The 10× depuration cows were sacrificed 3, 7, 14, and 21 days post-dosing (study days 32, 36, 43, and 50). The remaining control cow was sacrificed on day 50. Additional milk samples were collected from the remaining control cow and the 10× dose depuration cows on days 31, 35, 38, and 42. Milk, tissues and excrement from the cows sacrificed at each interval were analyzed to monitor the decline of the residues of indaziflam and its metabolites.

Residues of indaziflam and its metabolites: indaziflam-acid ((2S,3R)-3-[[4-Amino-6-[(1R)-1-fluoroethyl]-1,3,5-triazin-2-yl]amino]-2,3-dihydro-2-methyl-1H-indene-5-carboxylic acid), indaziflam-3 hydroxyindane ((2R,3R)-3-[[4-amino-6-[(1R)-1-fluoroethyl]-1,3,5-triazin-2-yl]amino]-2,5-dimethyl-indan-1-ol), indaziflam-3-ketohydroxymethyl ((2R,3R)-3-[[4-amino-6-[(1R)-1-fluoroethyl]-1,3,5-triazin-2-yl]amino]-5-(hydroxymethyl)-2-methyl-indan-1-one) and indaziflam-triazinediamine (6-[(1R)-1-Fluoroethyl]-1,3,5-triazine-2,4-diamine) were quantitated by high performance liquid chromatography/triple stage quadrupole mass spectrometry (LC/MS/MS) using stable isotopically labeled internal standards.

The individual analyte derived residues were converted to indaziflam parent equivalents and summed to give a total indaziflam residue. The limit of quantitation (LOQ) for total indaziflam residue was 0.05 ppm for fat, kidney, muscle and liver. The LOQ for total indaziflam residue in milk was 0.025 ppm.

Average total indaziflam residues in milk, at the 28th day were 0.028 ppm, 0.038 ppm and 0.15 ppm, respectively at the 1×, 3× and 10× rates.

Average total indaziflam residues in fat ranged from 0.068 to 0.082 ppm, from 0.11 ppm to 0.12 ppm and from 0.27 ppm to 0.36 ppm, respectively, at the 1×, 3× and 10× rates.

Average total indaziflam residues in kidney were 0.10 ppm, 0.22 ppm and 0.74 ppm, respectively, at the 1×, 3× and 10× rates.

Average total indaziflam residues in liver were 0.20 ppm, 0.31 ppm and 1.3 ppm, respectively, at the 1×, 3× and 10× rates.

Average total indaziflam residues in muscle were <LOQ, 0.05 ppm and 0.08 ppm, respectively, at the 1×, 3× and 10× rates.

In the depuration phase, residues in all tissues and milk declined rapidly after the end of dosing.

Human safety risk assessments have been conducted, using current EPA practice, for all the current and proposed new uses of indaziflam. Chronic aggregate dietary exposure (food and water) will utilize less than 4% of the cPAD for the US Population. Acute aggregate dietary exposure (food and water) for the U.S. population, utilizes 7% of the aPAD. Non-dietary and aggregate margins of exposure (food, drinking water, and non-dietary) are above the Level of Concern.

Therefore, the aggregate assessment for all proposed uses for indaziflam demonstrates that there is a reasonable certainty that no harm will result to the U.S. Population and subpopulations from the proposed new use of indaziflam described here.

The invention claimed is:

1. A method of controlling fire size and frequency at a locus in need thereof, comprising:
applying to the locus an amount of a composition of indaziflam sufficient to reduce flammable biomass at the locus,
wherein the locus is a pasture used for grazing domestic livestock, and
wherein the pasture is safe for grazing by the domestic livestock immediately following the application of indaziflam.

2. The method according to claim 1, wherein the livestock is ruminant animals.

3. The method according to claim 1, wherein the livestock is cows, sheep, bison, horses, elk, moose, antelopes or deer.

4. The method according to claim 1, wherein the livestock is cows.

5. The method according to claim 1, wherein the milk of the livestock is to be consumed by humans.

6. The method according to claim 1, wherein the meat of the livestock is to be consumed by humans.

7. The method according to claim 1, wherein the composition is applied at a rate of 0.001 to 100 oz/A.

8. The method according to claim 1, wherein the composition is applied at a rate of 0.01 to 75 oz/A.

9. The method according to claim 1, wherein the composition is applied at a rate of 0.1 to 50 oz/A.

10. The method according to claim 1, wherein the composition is applied in an amount of 0.001 to 25 lb. ai/A.

11. The method according to claim 1, wherein the composition is applied in an amount of 0.005 to 10 lb. ai/A.

12. The method according to claim 1, wherein the composition is applied in an amount of 0.01 to 1 lb. ai/A.

13. The method according to claim 1, wherein the composition comprises indaziflam in an amount of 0.001 to 50 lb./gallon.

14. The method according to claim 1, wherein the composition comprises indaziflam in an amount of 0.01 to 25 lb./gallon.

15. The method according to claim 1, wherein the composition comprises indaziflam in an amount of 0.1 to 10 lb./gallon.

16. The method according to claim 1, wherein the biomass is derived in whole or in part from an invasive grass species, and wherein said invasive grass belongs to the genera *Microstegium, Digitaria, Poa, Bromus, Ventenata, Taeniatherum, Secale,* and *Aegilops*.

17. The method according to claim 16, wherein the livestock is ruminant animals.

18. The method according to claim 16, wherein the milk or the meat of the livestock is to be consumed by humans.

19. The method according to claim 1, wherein the flammable biomass comprises thatch.

20. The method according to claim 1, wherein the application of indaziflam promotes a discontinuous fire system over a horizontally continuous fire system.

* * * * *